(12) United States Patent
Nielson et al.

(10) Patent No.: US 11,627,772 B2
(45) Date of Patent: Apr. 18, 2023

(54) SHAPE-ADJUSTABLE CHROMA KEY COMPATIBLE MANNEQUIN OR BODY SUIT, AND ASSOCIATED 3D IMAGE CAPTURE EQUIPMENT

(71) Applicant: Swipe Fashion Incorporation, Fernie (CA)

(72) Inventors: Kevin Nielson, Regina (CA); Husam Kinawi, Calgary (CA)

(73) Assignee: Swipe Fashion Incorporation, Fernie (CA)

( * ) Notice: Subject to any disclaimer, the term of this patent is extended or adjusted under 35 U.S.C. 154(b) by 112 days.

(21) Appl. No.: 17/330,044

(22) Filed: May 25, 2021

(65) Prior Publication Data

US 2022/0395043 A1 Dec. 15, 2022

Related U.S. Application Data

(62) Division of application No. 16/502,652, filed on Jul. 3, 2019, now abandoned.

(60) Provisional application No. 62/695,408, filed on Jul. 9, 2018.

(51) Int. Cl.
*A41H 5/02* (2006.01)
(52) U.S. Cl.
CPC ..................... *A41H 5/02* (2013.01)
(58) Field of Classification Search
CPC .................. A41H 5/02; A47F 8/00
USPC .......................................... 227/67
See application file for complete search history.

(56) References Cited

U.S. PATENT DOCUMENTS

| | | | | |
|---|---|---|---|---|
| 2,445,458 A | * | 7/1948 | Simonsen | A41H 5/02 223/67 |
| 2,529,125 A | * | 11/1950 | Barbera | A47F 8/00 223/67 |
| 2,720,347 A | * | 10/1955 | Jackson | D06F 73/00 223/67 |
| 2,740,565 A | * | 4/1956 | Wells | A47F 8/00 223/67 |
| 3,382,504 A | * | 5/1968 | Barbosa | A41D 1/00 D2/741 |
| 3,710,994 A | * | 1/1973 | Cherry | A47F 8/00 223/67 |
| 5,419,729 A | * | 5/1995 | Gross | A63H 3/06 446/268 |

(Continued)

*Primary Examiner* — F Griffin Hall
(74) *Attorney, Agent, or Firm* — Kyle R Satterthwaite; Ryan W Dupuis; Ade & Company Inc.

(57) ABSTRACT

A body suit resembles at least a partial human body form for use in design, customization, alteration, testing and modeling of garments. The suit includes a plurality of fluid-expandable layers, including an outer skin layer divided into an outer plurality of selectively expandable in varying degrees or quantities to create a variable exterior skin contour. One or more additional fluid-expandable layers underlie the outer skin layer to establish a variable internal tissue depth further contributing to an overall outer body contour of the body suit. An exterior of the body suit is colored or colorable in blue or green to enable chroma key isolation of garment adorned over the suit. Sensors are arrayed over the exterior surface area of the suit for dimensional and pressure measurements, and rotational support structures and cooperating 3D scanners and track-based scanner movement enable 3D imaging of the modeled garment.

17 Claims, 10 Drawing Sheets

(56) References Cited

U.S. PATENT DOCUMENTS

| | | | | |
|---|---|---|---|---|
| 5,467,543 A * | 11/1995 | Fink | ................ | A63H 3/06 |
| | | | | 446/178 |
| 6,805,606 B1 * | 10/2004 | Kellum | ................ | A63H 3/36 |
| | | | | 92/92 |
| 6,991,510 B2 * | 1/2006 | Nan | ................ | A47F 8/00 |
| | | | | 446/220 |
| 7,530,480 B2 * | 5/2009 | Nan | ................ | A41H 5/02 |
| | | | | 600/38 |
| 9,055,825 B2 * | 6/2015 | Sadaoka | ................ | A47F 8/00 |
| 9,542,769 B2 * | 1/2017 | Kim | ................ | G06T 17/20 |
| 9,696,130 B1 * | 7/2017 | Eakins | ................ | G01B 21/20 |
| 2012/0284148 A1 * | 11/2012 | Volchek | ................ | G06Q 30/0603 |
| | | | | 223/66 |
| 2013/0238285 A1 * | 9/2013 | Volchek | ................ | A41H 5/01 |
| | | | | 702/188 |
| 2015/0112648 A1 * | 4/2015 | Abu Al Rubb | ................ | A41H 5/02 |
| | | | | 703/1 |
| 2016/0042667 A1 * | 2/2016 | Kusafuka | ................ | A63B 69/0002 |
| | | | | 434/365 |

* cited by examiner

SHAPE-ADJUSTABLE CHROMA KEY COMPATIBLE MANNEQUIN OR BODY SUIT, AND ASSOCIATED 3D IMAGE CAPTURE EQUIPMENT

CROSS-REFERENCE TO RELATED APPLICATIONS

This application is a divisional of U.S. Non-provisional patent application Ser. No. 16/502,652, filed Jul. 3, 2019, which claims benefit under 35 U.S.C. 119(e) of U.S. Provisional Application No. 62/695,408 filed Jul. 9, 2018, both of which are incorporated herein by reference in their respective entirety.

BACKGROUND

In the garment industry, it has been previously proposed to use shape-adjustable mannequins in order to allow designers and tailors to quickly customize a mannequin that accurately represents their customer, is reusable across a plurality of different customers, and enables the designer/tailor to accommodate the possible changes in a customer's body over time (for example, weight gain/loss, change in muscle tone, etc.). Custom fabrication of individual mannequins for each customer, whether by custom molding, machining or additive manufacturing, is time and cost prohibitive, and space intensive, and cannot conveniently account for variations in a customer's body shape over time.

U.S. Pat. Nos. 9,554,096 and 9,696,130 by Amazon Technologies Inc. discloses photographic modeling of clothing on such mannequins through a range of sizes, thereby allowing online shoppers to view an approximation of what a garment would like on a body type similar to their own. The reference describes incorporation of movable portions in or on the mannequin, listing such examples as electric motors, hydraulic components, magnetic components or inflatable components, but with no executional details other than a brief mention of motor driven screws for expanding and collapsing the movable portions in various dimensions.

U.S. Patent Application 2013/0238285 by Clonnequin Pty Ltd. discloses a size adjustable mannequin used for stress testing garments, assessing a weight gain allowance afforded by a garment, aiding in the fabrication of tailor made garments, and simulating the appearance of a garment on the customer. The detailed embodiment uses an array of pistons to vary the outer profile of the mannequin. The reference includes optional use of a 3D scanning device to obtain an outer body contour of a customer to be mimicked by the mannequin.

European Patent 2 568 835 by Euveka discloses a pneumatically shape-adjustable mannequin employing individual air bladders situated between an internal skeletal structure and an outer layer of chainmail that protects the bladders from puncture by needles used during the tailoring process.

Chinese Utility Model 203341056 discloses a mannequin in the form of a sealed hollow body of elastic material whose interior is divided into a plurality of separate inflatable cavities.

Chinese Patent 103976495 discloses another inflatable mannequin, but instead of separate cavities or individual bladders, a single inflatable body is used, and small motor driven winches arrayed inside the body pull inwardly on tether lines anchored to the outer skin so that inward puckering of different areas changes the overall outer shape contour of the body.

There remains room for novelty and improvement in the design of shape adjustable mannequins, the materials used to create shape adjustable mannequins, and new useful applications for same, particularly since the mannequins of the prior art offer limited shape adaptability due to use of relatively large inflation cavities or bladders, or require bulky or complex mechanical solutions such as a large array of motorized winches or displaceable pistons.

Additionally, there's a need for solutions for convenient and accurate 3D image capture of mannequin modeled garments, particularly in the forgoing instance of shape adjustable mannequins that can be used to accurately model the human body, for example so that a customer can benefit from a comprehensive 3D viewing of a garment of interest as it would fit on their unique body shape.

Prior publications concerning image capture of modeled clothing or 3D image capture of various subjects or scenes include US2008/0262944A1, U.S. Pat. Nos. 6,834,960, 7,039,486, 9,542,769, U.S. Ser. No. 10/096,141, DE102007052300, KR20180060160, CN105301887, CN204065655 and CN203482294, but none of which are particularly well suited to the applications contemplated herein.

SUMMARY OF THE INVENTION

According to a first aspect of the invention, there is provided a shape adjustable body comprising:
a body suit resembling a partial or complete human body form, and comprising a plurality of fluid-expandable layers, including:
    an outer skin layer comprising an outer plurality of fluid-expandable cells arranged for selective fluid-driven expansion thereof in varying degrees or quantities to create a variable exterior skin contour of said body suit; and
    one or more additional layers underlying the outer skin layer and arranged for selective fluid-driven expansion thereof varying degrees or quantities to create a variable internal tissue depth beneath said variable exterior skin contour of said body suit, whereby the variable skeletal/tissue depth and variable exterior skin contour cooperatively determine an overall outer body contour of the body suit.

Preferably, the one or more additional layers each comprise a respective plurality of fluid-expandable cells of larger size than the outer plurality of fluid-expandable cells in the outer skin layer.

Preferably, the one or more additional layers comprises an innermost layer contributing a skeletal/muscular shape profile, and an intermediate layer disposed between the innermost layer and the outer skin layer and contributing a fat tissue contour atop said skeletal/muscular shape profile.

Preferably, the outer skin layer comprises a fluid channel underlying at least some of the outer plurality of fluid-expandable cells, each of which is fluidly communicable with said fluid channel through a respective control valve operable to control opening and closing of the outer plurality of fluid-expandable cells to said fluid channel.

Preferably, at least some of the outer plurality of fluid-expandable cells each have at least one of the following:
    (a) a positional sensor that is mounted on, embedded in, or integrated within an outer envelope of the outermost skin layer and is operable to monitor a position in space to which said positional sensor is displaced by fluid-driven expansion of said body suit;

(b) a flow sensor operable to measure fluid flow into the fluid-expandable cell;

(c) a pressure sensor mounted on, embedded in, or integrated within an outer envelope of the outermost skin layer operable to gauge a tightness of a garment adorned thereover.

Preferably, the shape adjustable body is used in combination with a pressurized fluid source and a computerized controller storing body shape data representative of a targeted human body shape to be emulated by said body suit, wherein said pressurized fluid source is coupled to the body suit to convey pressurized fluid to the fluid-expandable cells, the computerized controller is connected to a plurality of valves installed in fluid pathways between the pressurized fluid source and the outer plurality of fluid-expandable cells, and the computerized controller, based on a mapping of body measurement data points from the body shape data to the plurality of fluid-expandable outer cells, is operable to control said plurality of valves to selectively expand the fluid-expandable cells to emulate the targeted human body shape.

In some embodiments, the body suit comprises internally located illumination sources operable to impart colored illumination to an exterior of the outer skin layer to simulate a skin color of a human subject.

In some embodiments, an exterior of the outer skin layer is colored, or arranged for selective coloring, in green or blue for enabling application of chroma key compositing techniques to video or still images taken of said body suit.

In such embodiments, the internally located illumination sources may be operable to impart blue or green color to the exterior of the outer skin layer.

In some embodiments, said body suit has a hollow central space that spans head to toe of said body suit and is surrounded by the outermost skin layer and the one or more additional layers, whereby said body suit compatible for use with a separate core body over which the body suit is wearable as a separate cover.

In some embodiments, there are a set of tether anchors mounted or mountable at extremities of the body suit, and for each tether anchor, at least one tether having a first end connected or connectable to said tether anchor and a second end connectable to a sleeve, leg cuff or hem of a garment worn over said body suit to prevent said garment from riding up from the extremities of said body suit during expansion thereof.

The shape adjustable body may be used in combination with in combination with a rotational support structure by which said shape adjustable body is rotatably supported or supportable to enable driven rotation of said shape-adjustable body about an axis by the rotational support structure to enable image capture of any garments adorned on said shape adjustable body from multiple sides thereof.

Preferably, the rotational support structure comprises a fluid conveyance conduit supported thereon, or incorporated thereinto, to enable said fluid-driven expansion of the fluid-expandable cells of the body suit via said fluid conveyance conduit while said shape adjustable body is connected to the rotational support for driven rotation thereby.

Preferably, said fluid conveyance conduit enters said body suit on or along said axis.

Preferably, the rotational support structure comprises a fluid pump supported thereon, or incorporated thereinto, to effect said fluid-based fluid-driven expansion of the fluid-expandable cells of the body suit.

The combination may further comprise an image capture guidance assembly comprising a track placed or placeable in an upright working position facing the axis of the rotational support structure at a distance outward therefrom, a carriage configured for back and forth movement along said track in upward and downward directions thereon, and a holder on said carriage adapted to hold a digital imaging device thereon in an orientation facing toward the axis of the rotational support to capture imagery of the shape-adjustable body when rotatably supported by the rotational support structure, whereby movement of the carriage up and down said track enables image capture by said digital imaging device at multiple elevations along said track.

Preferably, said track has a curved shape with a concave side that, in the working position, faces toward the axis of the rotational support structure.

Preferably, said track is sized and shaped to place a lower segment of its concave side below a midsection of the shape adjustable body to impart an upwardly angled point of view to the digital imaging device at elevations below said midsection.

Preferably, said track is sized and shaped to place an upper segment of its concave side above a midsection of the shape adjustable body to impart a downwardly angled point of view to the digital imaging device at elevations above said midsection.

Preferably, said track is sized and shaped to place a central region of its concave side at generally equal elevation to a midsection of the shape adjustable body to impart a straight-on point of view to the digital imaging device at said generally equal elevation to the midsection of the shape adjustable body.

Preferably, said track is attached or selectively attachable to the rotational support structure in a manner placing said track at a predetermined position relative to said rotational support structure.

Preferably, the combination further comprises a computerized controller connected to both the rotational support structure and the image capture guidance system, and configured to co-operably control both rotation of the shape adjustable body by the rotational support structure and travel of the carriage back and forth along the track in order to capture imagery of the shape adjustable body from said multiple sides thereof and from said multiple elevations along said track.

Preferably, the computerized controller is configured to communicably connect with the digital imaging device separately of the rotational support and the image capture guidance system.

Preferably, the computerized controller is configured to wirelessly communicate with the digital imaging device.

Preferably, said image capture guidance system is electrically connected or connectable the rotational support in a manner enabling shared powering and/or control of both thereof from a common power and/or control source.

Preferably, the plurality of fluid-expandable cells of the outer skin layer comprise at least a first array of fluid-expandable cells, a first inner envelope shared by said first array of fluid-expandable cells, a first outer envelope shared by said first array of fluid-expandable cells, and a first set of dividing walls spanning between the first inner and outer envelopes to subdivide a first space therebetween into individual cells of the first array, whereby fluid-driven expansion of the individual cells of the first array in different degrees or quantities will bulge some areas of the first outer envelope further outwardly away from the first inner envelope than other areas, thereby establishing non-uniformity in the variable exterior skin profile.

Preferably, the outer skin layer comprises a second array of fluid-expandable cells underlying the first array of fluid-expandable cells, a second set of divider walls spanning between the inner envelope of the first array of fluid-expandable cells and an inner envelope of the second array of fluid-expandable cells to subdivide a second space therebetween into individual cells of the second array which are each neighboured by an adjacently stacked cell of the first array, and a respective inter-cell control valve installed between each individual cell of the second array and the adjacently stacked cell of the first array at the inner envelope of the first array to control airflow into the adjacently stacked cells of the first array from the individual cells of the second array during expansion of the outer skin layer.

According to a second aspect of the invention, there is provided a shape adjustable body comprising a body suit resembling at least a partial human body form and comprising an expandable/collapsible layer that comprises at least a first array of fluid-expandable cells, a first inner envelope shared by said first array of fluid-expandable cells, a first outer envelope shared by said first array of fluid-expandable cells, and a first set of dividing walls spanning between the first inner and outer envelopes to subdivide a first space therebetween into individual cells of the first array, whereby fluid-based expansion of the individual cells of the first array to different degrees will bulge respective areas of the first outer envelope further outwardly away from the first inner envelope to establish a non-uniform profile at the outer envelope of said array that contributes to or defines an outer body contour of the body suit.

Preferably, the expandable/collapsible layer comprises a second array of fluid-expandable cells underlying the first array of fluid-expandable cells, a second set of divider walls spanning between the inner envelope of the first array of fluid-expandable cells and an inner envelope of the second array of fluid-expandable cells to subdivide a second space therebetween into individual cells of the second array that each neighboured by an adjacently stacked cell of the first array, and a respective inter-cell control valve installed between each individual cell of the second array and the adjacently stacked cell of the first array at the inner envelope of the first array to control airflow into the adjacently stacked cells of the first array from the individual cells of the second array during expansion of the expandable/collapsible layer.

Preferably, the first outer envelope of the first array of fluid expandable cells has sensors mounted on, embedded in, or integrated within said first outer envelope.

According to a third aspect of the invention, there is provided a shape adjustable body comprising a body suit resembling at least a partial human body form and comprising a plurality of fluid-expandable cells arranged for selective fluid-driven expansion thereof in varying degrees or quantities to create a variable outer body contour of said body suit, and an exterior that is colored, or arranged for selective coloring, in green or blue for enabling application of chroma key compositing techniques to video or still images taken of said body suit.

The shape adjustable body may comprise internally located illumination sources operable to impart blue or green color to the exterior.

According to a fourth aspect of the invention, there is provided a method of using the shape adjustable body of the third aspect of the invention, said method comprising, with the body suit fluidly expanded to acquire a particular outer body contour resembling a targeted human body shape, capturing one or more digital images of a garment that is adorned on said body suit in a position covering some areas of said body suit while leaving one or more other green or blue colored areas of said exterior of said body suit exposed outside the garment, then using chroma key compositing to generate one or more composite images in which the one or more other green or blue colored areas of said body suit are omitted.

In some instances, the targeted human body shape is determined by a customer's body shape, and the one or more composite images are presented or made available to the customer to provide visual feedback on a fit of garment on said customer's body shape without requiring said customer to physically try on said garment.

According to a fifth aspect of the invention, there is provided a shape adjustable body comprising:
  a body suit resembling at least a partial human body form, and comprising:
    at least one expandable/collapsible layer that comprises:
    at least a first array of fluid-expandable cells; and
    a fluid channel underlying said first array of fluid-expandable cells, each of which is fluidly communicable with said fluid channel through a respective control valve operable to control opening and closing of the fluid-expandable cells to said fluid channel.

Preferably, there is a second array of fluid-expandable cells overlying the first array of fluid-expandable cells, and a respective inter-cell control valve installed between each fluid-expandable cell of the first array and an adjacently stacked cell of the second array to control airflow into the fluid-expandable cells of the second array from the fluid-expandable cells of the first array during expansion of the expandable/collapsible layer.

Preferably, at least one array of fluid expandable cells comprises sensors mounted on, embedded in, or integrated within an outer envelope of the fluid expandable cells of said at least one array.

According to a sixth aspect of the invention, there is provided a system for modeling clothing on a body form, said system comprising:
  a shape-adjustable mannequin comprising a body suit resembling at least a partial human body form and comprising plurality of fluid-expandable cells arranged for selective fluid-driven expansion thereof in varying degrees or quantities to create a variable exterior skin contour of said body suit; and
  a rotational support structure by which said shape-adjustable mannequin is rotatably supported or supportable to enable driven rotation of said shape-adjustable mannequin about an axis by the rotational support structure to enable image capture of any garments adorned on said shape-adjustable mannequin from multiple sides thereof;
  wherein the system is further characterized by inclusion of at least one of the following features:
    (a) a fluid conveyance conduit supported on, or incorporated into, the rotational support structure to enable said fluid-driven expansion of the fluid-expandable cells of the body suit via said fluid conveyance conduit while said shape-adjustable mannequin is connected to the rotational support for driven rotation thereby;
    (b) a fluid pump supported on, or incorporated into, the rotational support structure to effect said fluid-based fluid-driven expansion of the fluid-expandable cells of the body suit.

According to a seventh aspect of the invention, there is provided a system for use in three-dimensional image capture of clothing modeled on a body form, said system comprising:
  a mannequin; and a rotational support structure by which said mannequin is rotatably supported or supportable to enable driven rotation of said mannequin about an axis by the rotational support structure to enable image capture of any garments adorned on said mannequin from multiple sides thereof; and an image capture guidance assembly comprising:

a track placed or placeable in an upright working position facing the axis of the rotational support at a distance outward therefrom;

a carriage configured for back and forth movement along said track in upward and downward directions thereon; and a holder on said carriage adapted to hold a digital imaging device thereon in an orientation facing toward the axis of the rotational support to capture imagery of the mannequin when rotatably supported by the rotational support, whereby movement of the carriage up and down said track enables image capture by said digital imaging device at multiple elevations along said track.

BRIEF DESCRIPTION OF THE DRAWINGS

Preferred embodiments of the invention will now be described in conjunction with the accompanying drawings in which.

DETAILED DESCRIPTION

Figure 1:
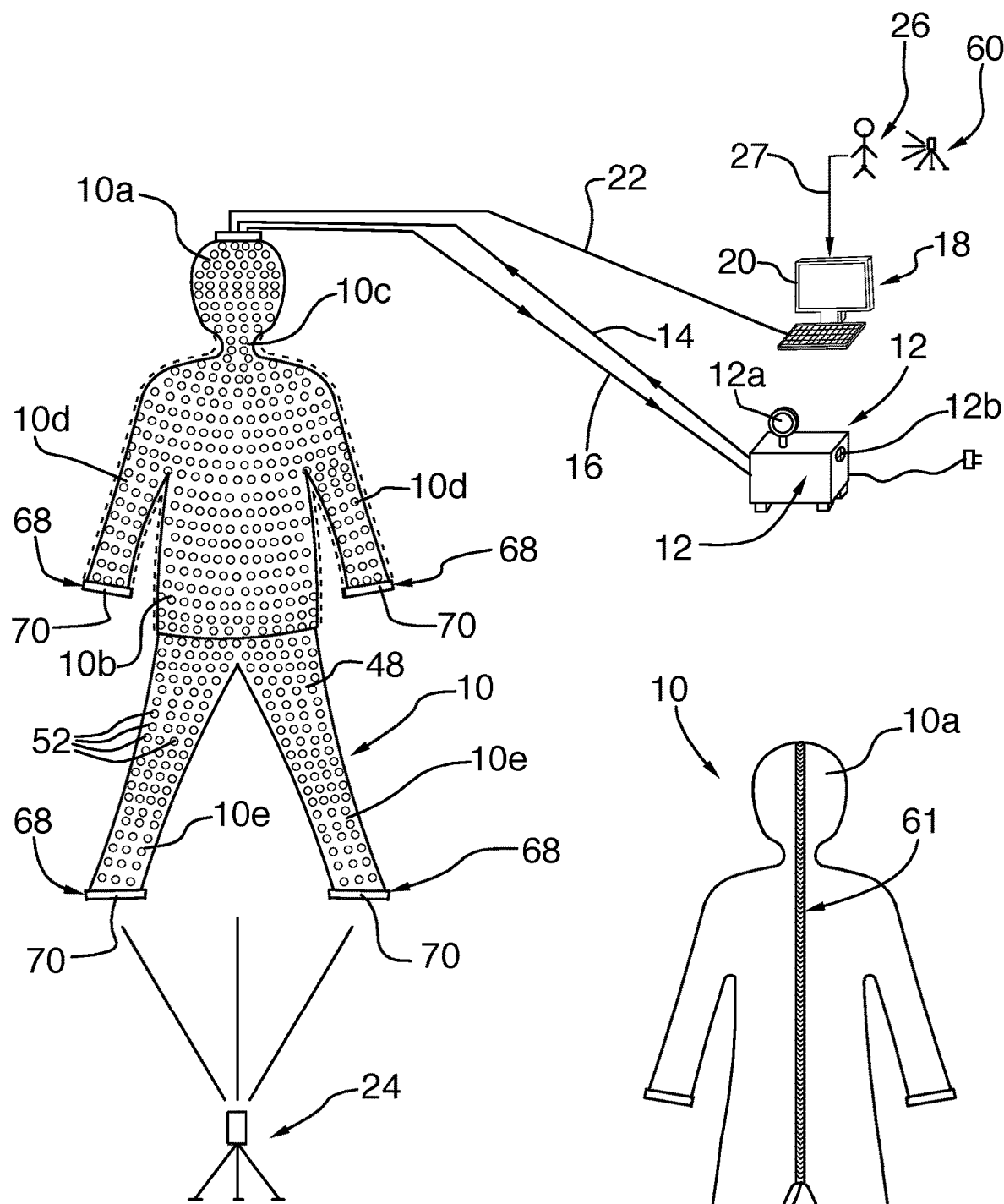
FIG. 1 is a schematic view of a shape adjustable body suit system according to the present invention.

FIG. 1 illustrates a shape-adjustable body suit system according to one preferred embodiment of the present invention, in which a fluid-expandable body suit 10 is co-operable with a pressurized fluid source 12 fluidly connected thereto to vary the suit's outer dimensions and outer shape contour by selective fluid-driven expansion of various fluid cells arrayed throughout the body suit 10. The term fluid is used herein in its broadest sense, thus encompassing both gases and liquids, and so the pressurized fluid source 12 for conveying fluid into the body suit under pressure may be any variety of fluid pump. In one preferred embodiment, the fluid pump is an air compressor or blower that draws in ambient air from the surrounding environment and pumps it into the body suit. Such pneumatic embodiments employing ambient air as the pressurized fluid for filling the fluid cells reduce the potential mess of leakage/spillage in hydraulic embodiments that would instead use liquid to fill and expand the fluid cells. Pneumatic embodiments may also benefit from reduced system complexities by using ambient air as the fluid source for an open-loop fluid circuit that eliminates the need for a return line that would connect the body suit back to the fluid pump in a closed loop. While the drawings show both a supply line 14 from the pressurized fluid source 12 to the body suit 10 and a return line 16 from the body suit 10 back to the pressurized fluid source 12, thereby denoting optional use of a closed loop fluid circuit, it will therefore be appreciated that the return line may optionally be omitted in the case of an open loop pneumatic circuit.

A computerized controller 18 comprises one or more computers each having at least one processor and one or more non-transient computer readable media operably connected thereto to store both executable software for controlling operation of the body suit 10, and user data relied on during such execution of the software for various purposes in which control of the body suit is tailored according to the particulars of a given user or given set of users. The executable software embodied in statements and instructions for execution by the one or more processors may be stored on separate non-transient computer readable media from the user data, and either or both of the software and the user data may be distributed across multiple non-transient computer readable media, for example in a cloud computing or distributed network environment. User data amassed for a plurality of users may be collected and stored within a user database. The computerized controller preferably includes at least one local computer 20 at the same location as the body suit 10, and connected thereto by a suitable wired or wireless data connection 22 by which signals relevant to the control of the body suit can be communicated back and forth between the body suit and the local computer via an input/output interface thereof. In one example, the connection may be made via a USB cable connected to an existing USB interface of the local computer and a USB connection port installed on the body suit 10.

An on-site digital imaging device 24 is also provided at the same location as the body suit 10 and the local computer, and may be operable to capture video images, still 2D images, and/or 3D images. The latter may be achieved using a dedicated 3D image scanner, or a 3D image scanner application running on a general-purpose computing device with a built-in or externally-connected image capture device (e.g. smartphone, tablet computer, or laptop computer with a built-in camera; or a desktop or laptop computer connected to an a peripheral camera (e.g. webcam)). In some embodiments, the local computer 20 and the on-site digital imaging device 24 may be embodied together (e.g. in camera-equipped laptop or tablet, or in a camera-connected desktop computer). The user data is received at the computerized controller 18 from remote users 26 via a wide area network connection 27, for example via the internet.

Still referring to FIG. 1, the body suit 10 is referred to as such since, in use, its outer shape generally resembles that of a human body, thus having a head 10a connected to an underlying torso 10b by a neck 10c, two arms 10d hanging alongside the torso from respective shoulders on opposing sides thereof, and two legs 10e hanging from the torso. While the illustrated example is a full body suit embodying a head, torso and four appendages to resemble the full human form, alternate embodiments of the body suit may be partial body suits resembling only partial human form, for example an upper body suit including a torso and arms (and optionally a head and neck), but lacking leg appendages, expressly for use with shirts, blouses, sweaters, jackets or other exclusively upper body garments.

Figure 3:
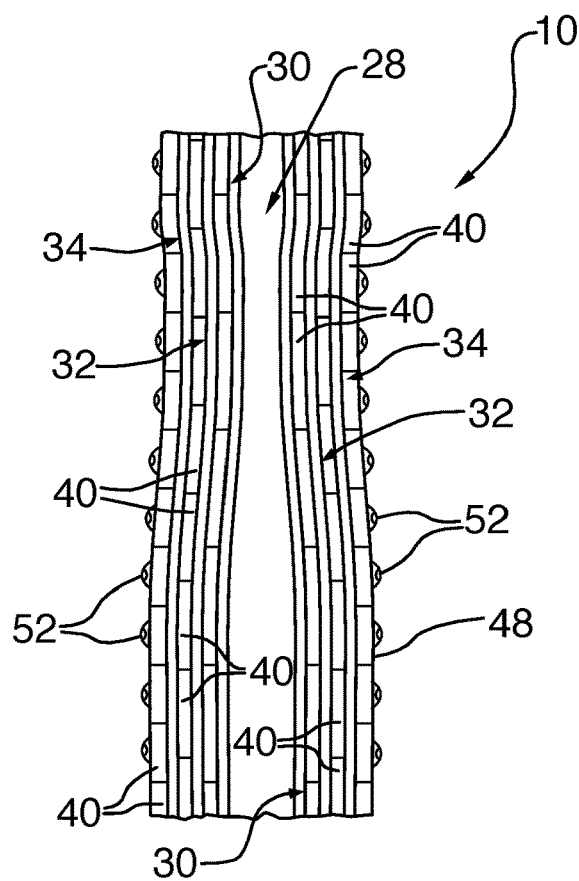
FIG. 3 is a cross-sectional view of a portion of the inflatable body suit of FIG. 2 showing multiple single-array layers thereof in an uninflated state.
Figure 3A:
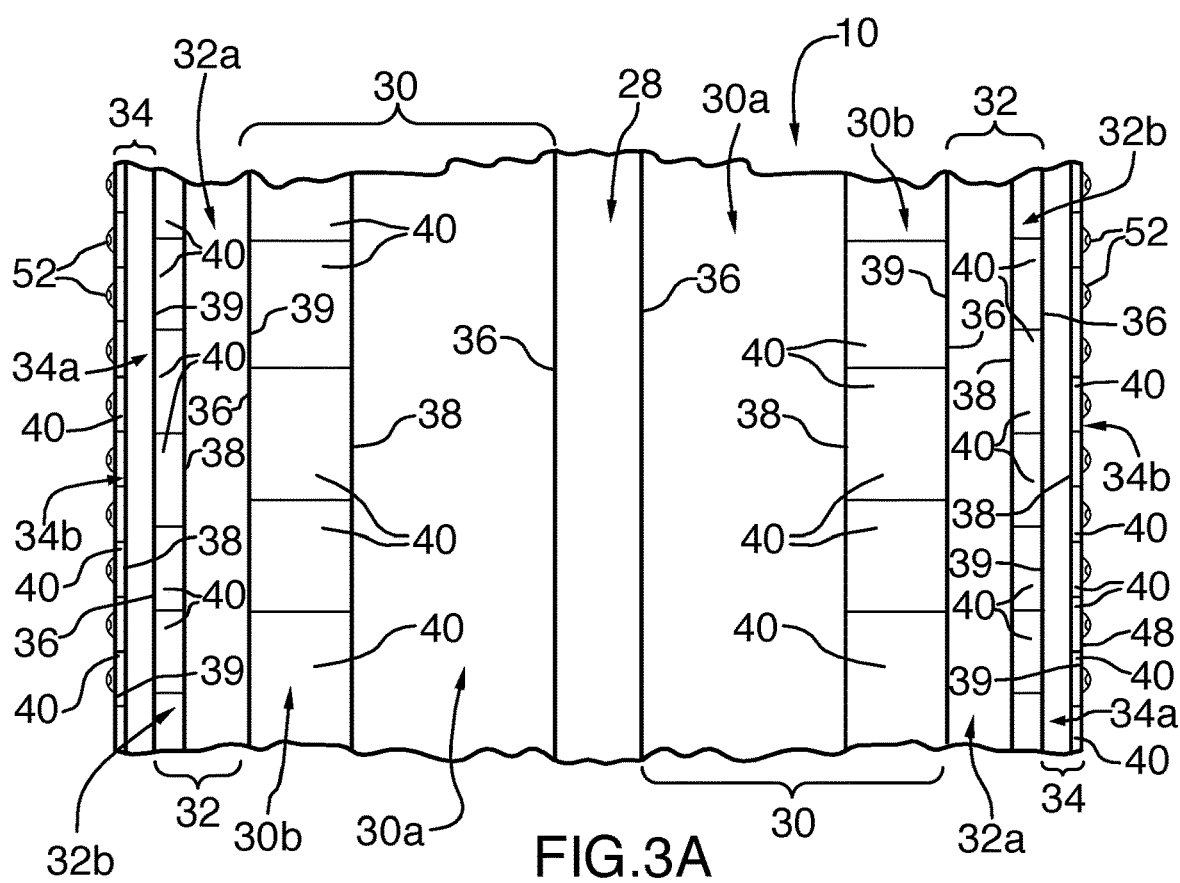
FIG. 3A illustrates the same portion of the inflatable body suit as FIG. 3A, but in an inflated state.

FIG. 3 illustrates a portion of the body suit that has been vertically sectioned in an anterior-posterior direction at a mid-plane of the torso. The cross-section reveals that the body suit 10 has a multi-layer construction in which each layer features a collection of fluid-expandable cells or chambers. Such multi-layered design provides a greater degree of shape-control than achievable with prior shape-adjustable mannequins.

In the illustrated embodiment, there are three distinct tissue-emulating layers in the body suit construction, namely an innermost skeletal/muscular tissue layer 30, an intermediate fat tissue layer 32, and an outermost skin tissue layer 34. This helps better approximate the human body, where the overall outer shape of the human body is influenced by variability in the different human tissue layers. This multi-layered design enables more accurate representation of a customer's physique, body mass index, etc. In addition to such improved realism in modeling of the customer's body type, this is also helpful to gauge the fit of the clothing in dynamic positions—for example, how a pair of pants fit and stretch during exercise of the customer, where the particular shape of a leg or other body part will vary as muscles are flexed in varying degrees and combinations. The body suit 10 features a hollow central space 28 that spans head to toe of the body suit and is surrounded on all sides by the innermost skeletal/muscular tissue layer 30. This hollow central space 28 allows the body suit 10 to optionally be adorned over a core body that provides a more rigid internal structure by which the head, torso, arms and legs of the flexible body suit can be held in relative positions best resembling various natural positions of the human form. The core body may be defined by a conventional statically-sized mannequin of fixed non-adjustable size, or by a size-adjustable unit, for example of the type described elsewhere herein with reference to FIG. 5. However, the body suit 10 may alternatively be used on its own, absent a core body within the hollow interior.

Each tissue layer 30, 32, 34 of the body suit 10 is composed of two sub-layers, namely a fluid channel sub-layer 30a, 32a, 34a nearest the hollow central space 28 of the body suit, and a fluid cell sub-layer 30b, 32b, 34b overlying the fluid channel sub-layer. Each fluid channel sub-layer 30a, 32a, 34a features an inner wall 36 nearest the hollow central space 28, and an outer wall 38 that overlies the inner wall. These inner and outer walls cooperatively delimit a fluid channel between them, by which fluid can be pumped into and subsequently evacuated from the respective tissue layer of the body suit. Each fluid-cell sub-layer 30b, 32b, 34b is delimited between the outer wall 38 of the respective fluid channel sub-layer of the same tissue layer, and an outermost wall 39 of this tissue layer furthest from the hollow central space 28. Each fluid-cell sub-layer is sub-divided or compartmentalized into individual fluid cells 40 capable of being selectively filled with pressurized fluid through the adjacent fluid channel sub-layer of the same tissue layer.

FIG. 3 shows a simplified embodiment of the suit in which the fluid cell sub-layer of each tissue layer comprises only a single array of fluid cells directly adjacent the fluid channel sub-layer of that tissue layer. However, turning to FIG. 4, each fluid cell sub-layer 30b, 32b, 34b may comprise multiple arrays of fluid cells stacked atop one another for more refined adjustability in the overall outer shape of the body suit. In the illustrated example, the innermost skeletal/muscular tissue layer 30 features two fluid cells arrays, namely an inner cell array 42a situated adjacent the fluid-channel sub-layer 30a of the innermost skeletal/muscular tissue layer 30, and an outer cell array 42b situated adjacent the fluid-channel sub-layer 32a of the intermediate fat tissue layer 32. Each cell array features an inner envelope situated nearest the hollow central space of the body suit, an opposing outer envelope surrounding the inner envelope, and divider walls each connected between the inner and outer envelopes to subdivide the space therebetween into the individual fluid cells 40 of the cell array. The inner envelope of the inner cell array 42a of the innermost skeletal/muscular tissue layer 30 is defined by a same flexible sheet or membrane as the outer wall 38 of the fluid channel sub-layer 30a of the innermost skeletal/muscular tissue layer 30. The outer envelope of the inner cell array 42a of the innermost skeletal/muscular tissue layer 30 is defined by the same flexible sheet or membrane as the inner envelope of the outer cell array 42b of the innermost skeletal/muscular tissue layer 30. The outer envelope of the outer cell array 42b of the innermost skeletal/muscular tissue layer 30 is defined by the same flexible sheet or membrane as the inner wall 36 of the fluid channels sublayer 32a of the intermediate fat tissue layer 32.

In the illustrated example, the intermediate fat tissue layer 32 also features two cell arrays, and so the inner envelope of the inner cell array 44a of the intermediate fat tissue layer 32 is defined by the same flexible sheet or membrane as the outer wall 38 of the fluid channel sub-layer 32a of the intermediate fat tissue layer 32. The outer envelope of the inner cell array 44a of the intermediate fat tissue layer 32 is defined by the same flexible sheet or membrane as the inner envelope of the outer cell array 44b of the intermediate fat tissue layer 32. The outer envelope of the outer cell array 44b of the intermediate fat tissue layer 32 is defined by the same flexible sheet or membrane as the inner wall 36 of the fluid-channel sub-layer 34a of the outermost skin tissue layer 34.

As shown, the outermost skin tissue layer 34 may feature a greater quantity of cell arrays than the other tissues layers.

In the illustrated example, the outermost skin tissue layer 34 features three cell arrays, namely an inner cell array 46*a* situated adjacent the fluid-channel sub-layer 34*a* of the outermost skin tissue layer 34, an outer cell array 46*b* situated furthest from the hollow central space 28 of the body suit, and an intermediate cell array 46*c* situated between the inner and outer cell arrays 46*a*, 46*b* of the outermost skin tissue layer 34. Accordingly, the inner envelope of the inner cell array 46*a* of the outermost skin tissue layer 34 is defined by the same flexible sheet or membrane as the outer wall 38 of the fluid channel sub-layer 34*a* of the outermost skin tissue layer 34. The outer envelope of the inner cell array 46*a* of the outermost skin tissue layer 34 is defined by the same flexible sheet or membrane as the inner envelope of the intermediate cell array 46*c* of the outermost skin tissue layer 34. The outer envelope of the intermediate cell array 46*c* of the outermost skin tissue layer 34 is defined by the same flexible sheet or membrane as the inner envelope of the outer cell array 46*b* of the outermost skin tissue layer 34. The outer envelope of the outer cell array 46*b* of the outermost skin tissue layer 34 is defined by an outermost wall of the body suit that defines the exterior surface 48 of the body suit 10.

Each individual fluid cell 40 features a respective electronic cell control valve 50 installed on the inner envelope of the respective cell array in which it is found, whereby this cell control valve 50 can be electronically switched between an open state capable of admitting or exhausting fluid to or from the fluid cell, and a closed state preventing admission or exhaust of fluid to or from the fluid cell. Each fluid cell 40 in an outer or intermediate cell array that overlies the inner cell array of the same tissue layer resides in stacked relation overtop a respective fluid cell in the inner array in one to one relationship therewith. The cell control valves 50 of the inner cell array in each tissue layer are thus operable to selectively control whether fluid can enter or exit the overall fluid cell sub-layer of the respective tissue layer from or to the fluid channel sub-layer of that same tissue layer. The cell control valves of the outer or intermediate cell array that overlies a given inner cell array are operable control whether fluid can enter or exit this overlying outer or intermediate cell array from or to the underlying inner cell array, and thus are referred to herein as inter-cell valves. In the three-array outer skin tissue layer, the cell control valves of the outer cell array overlying the intermediate cell array likewise control whether fluid can enter or exit this overlying outer cell array from or to the underlying intermediate cell array, and thus are likewise also referred to herein as inter-cell valves. The fluid cells in each tissue layer are communicable only with the fluid-channel sub-layer of the same tissue layer, and not with the fluid channel sub-layer or fluid cell sub-layer of any other tissue layer.

In each tissue layer of the body suit 10, the inner and outer fluid-channel walls 36, 38, the inner and outer envelopes of the cell arrays, and the divider walls of the cell arrays are defined by respective sheets or pieces of a flexible and resiliently stretchable material, for example rubber, nylon, vinyl, or combinations or composites thereof. The fluid channel walls and fluid cell envelopes are thus sheets or membranes of flexible and stretchable material laid over one another, and interconnected by smaller pieces of flexible and stretchable material defining the alsomembranelike divider walls that separate the individual fluid cells from one another. In a relaxed or unstretched natural state of the material, each fluid cell will thus possess a minimized internal volume. However, when sufficient fluid to fill the fluid channels of the tissue layers is pumped into the fluid channels of the tissue layers from the pressurized fluid source, opening of any cell control valve 50 in the inner cell array of any tissue layer will cause the respective fluid cell of said inner cell array to start filling with fluid, and once the initial minimal volume of this fluid cell is filled, the continued pumping of the fluid under pressure causes pressurization and expansion of that opened fluid cell. The outer envelope of this inner cell array thus bulges outwardly at this pressurized cell, which in turn pushes the overlying cell array(s) of the same tissue layer and any other overlying tissue layer outwardly away from the hollow central space 28 of the body suit, thereby imparting a localized rise in the outer shape profile of the body suit at the exterior surface 48 thereof. This degree of localized rise in the outer shape profile can be increased by opening the inter-cell valve of the adjacently stacked fluid cell in the overlying outer or intermediate cell array, thus pressurizing and expanding this adjacently stacked fluid cell to again force the exterior surface 48 of the body suit further outward at the localized area thereof overlying these pressurized cells.

Figure 4:
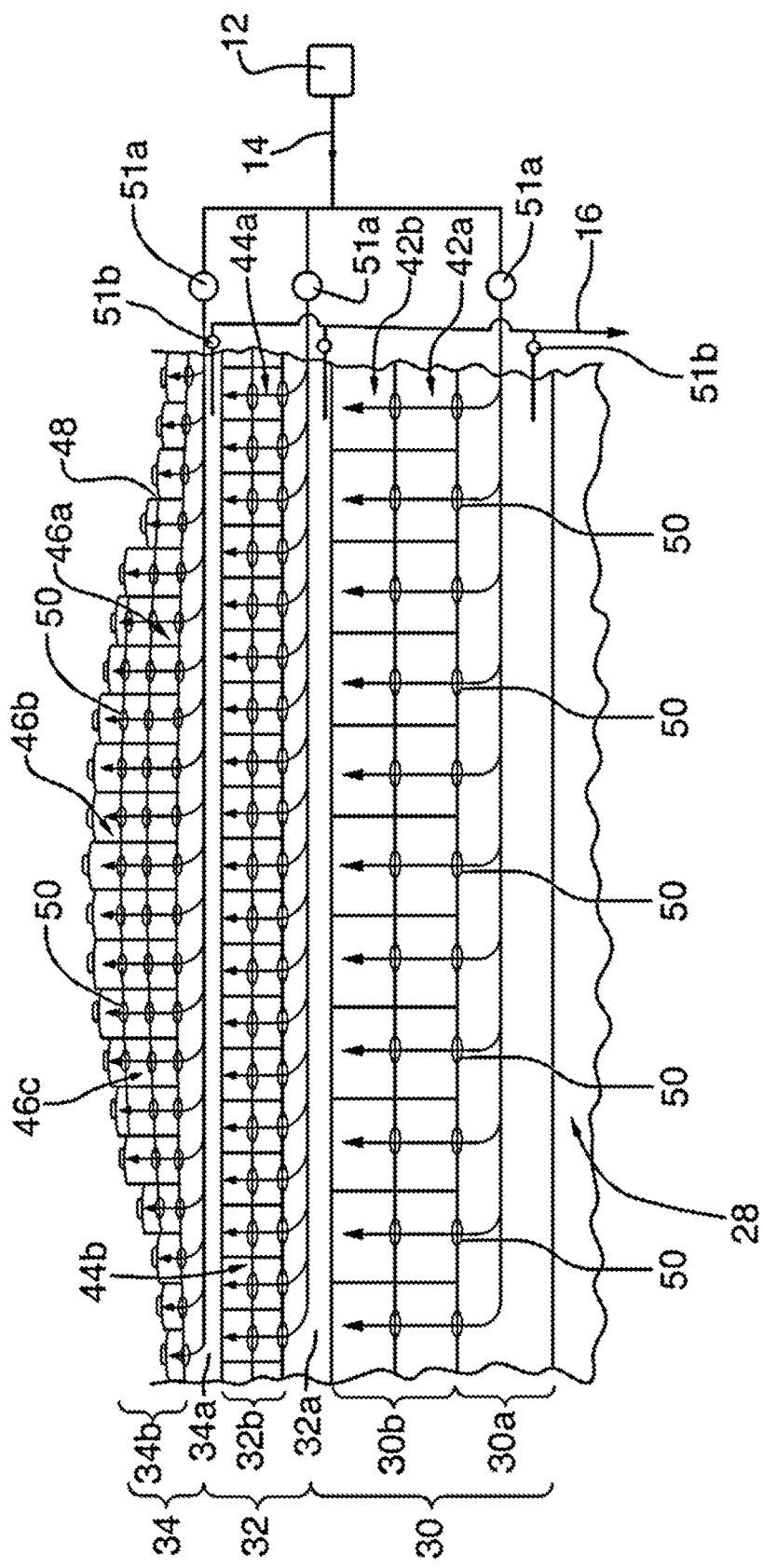
FIG. 4 is simplified schematic cross-sectional view similar to FIG. 3A, but of an embodiment featuring multi-array layers capable of a greater shape variation than the single-array layers of FIG. 3A.

In FIG. 4, arrows denote the flow of fluid in the different tissues layers during expansion thereof. During expansion, the pressurized fluid source 12 pumps fluid into the fluid channel of each layer via supply line 14, and the computerized controller opens up cell control valves 50 of a particular set of the cells that have been determined to require expansion based on a body shape data file indicative of a targeted shape to be imparted to the body suit. From this body shape data file, body measurement data points are mapped to respective locations on the exterior of the body suit. For any mapped area on the suit, the controller knows a maximum outer dimension of the suit corresponding to full expansion of all fluid cells that underlie said area in all layers and arrays, a minimum dimension corresponding to a collapsed empty state of all those cells, and an incremental amount by which said area can be displaced outwardly by fluidly expanding (e.g. inflating) those cells individually from their collapsed empty state. Based on this, the controller determines which cell control valves to open based on the targeted outer dimension for that area of the suit, as dictated by the respectively mapped body measurement data point from the body shape data file.

FIG. 4 shows a portion of the suit where all cell control valves 50 in both the inner and outer cell arrays of both the innermost skeletal/muscular tissue layer 30 and the intermediate fat tissue layer 32 have been opened over the entire illustrated range of cells in these layers to accomplish the maximum permitted expansion of these two tissue layers. Meanwhile, in the outermost skin tissue layer 34, all cell control valves of the inner cell array 46*a* are opened over the full illustrated cell range, while only a smaller subset of cell control valves in the intermediate cell array 46*c* are opened, thus leaving unopened cells in the intermediate cell array at the left and right ends of the illustrated cell range. In the outer cell array 46*b*, only an even smaller subset of cell control valves are opened, leaving even more unopened cells in the outer cell array at the left and right ends of the illustrated cell range. This particular pattern of selectively expanded cells among the three cell arrays of the outermost skin tissue layer 34 thus creates a non-uniform exterior skin contour of the suit that features a gradual protuberance peaking near the center of the figure. So, in the outermost skin layer in the illustrated example, all the cell control valves of the inner cell array are opened, but only some of the inter-cell control valves are opened, whereby only select subsets of the intermediate and outer cell arrays are expanded. When the full set of cells targeted for full or partial expansion in a given tissue layer have all been expanded to the targeted degree, a fill control valve 51a in a branch of the supply line 14 feeding that particular tissue layer is closed to maintain the current level of targeted cell expansion in that layer.

Similar targeted selection of subsets of cell control valves to open can be used in the innermost skeletal/muscular tissue layer to adjust the expansion and contour of the outer envelope of its outer cell array to simulate the skeletal/muscular size and shape of a particular human body, while similar targeted sub-selection of cell control valves in the intermediate fat tissue layer can be used to adjust the expansion and contour of the outer envelope of its outer cell array to simulate the size and shape of the particular human body's fat tissue layer. These two layers thus cooperatively define an internal tissue depth of the emulated body shape, while control over the valves of the outermost skin tissue layer are used to fine-tune the outermost skin contours of the emulated human body shape, whereby the three layers cooperatively determine an overall outer contour of the body suit that resembles the targeted human body shape. While the illustrated embodiment employs three independently expandable tissue layers, other embodiments with only two layers respectively emulating the outer skin tissue and internal skeletal/muscular/fat tissues may still nonetheless denote notable improvement over shape adjustable mannequins of the prior art.

During filling/expansion of the suit, and during maintenance of the suit's targeted level of expansion, respective release valves 51b in branches of the return line 16 are held closed. When use of the body suit is completed, these release valves 51b are opened to enable discharge of fluid from the different layers, whether by squeezing or gravitational drain of the suit, or application of suction to the return line. As mentioned above, a return line running back to the pressurized fluid source may be omitted in open loop designs, though an exhaust or drain line may still be included. A separate exhaust/drainage valve 51b for each layer may not be necessary if a single return/exhaust/drainage line connects to all layers of the suit, in which case a single valve on that line may be sufficient. Alternatively, in open-loop designs omitting any kind of return/exhaust/drain line, drain/exhaust ports installed directly on the suit itself at the fluid channels of the different tissue layers may be used to release fluid from the suit to return it to its fully collapsed/emptied state of minimal size.

The computerized controller may use volume-based or pressure-based techniques to determine the "filled" state of the targeted cells. For example, knowing a volume of fluid necessary to expand each cell of a layer to a "filled state" of predetermined volume, it can calculate the volume of flow necessary to accomplish filling of the targeted cells, and use a flow meter in the respective branch of the supply line 14 to trigger closure of the respective fill control valve 51a once this volume of fluid has been pumped through same. Alternatively, each fluid cell may be equipped with a respective internal pressure sensor, whether integrated into the cell control valve 50 or provided as a separate unit, which signals the computerized controller via the data connection 22 that the cell is "full" once a predetermined pressure threshold is exceeded, in which case receipt of "full" signals from all targeted fluid cells indicates that the layer has been selectively expanded in the targeted manner. In one embodiment, the state of a fluid cell may be gauged in binary terms, either empty or full, where "full" is achieved only when a static predetermined pressure threshold is met. In other embodiments with a higher degree of shape adjustability, different pressure threshold values may be assignable to a cell to denote different relative degrees of partial expansion or fullness that occur between a fully-empty or non-expanded state, and a fully expanded state. In such instance, the fully expanded state is equated with a "maximum fillage" pressure threshold, which is set at a safe value below a hazard threshold at which the fluid cell risks blowout and failure of the body suit.

In the illustrated embodiment, the cell size among the different tissue layers decreases in an outward direction from the hollow central space 28 of the body suit to the exterior surface 48 thereof. Accordingly, the fluid cells in the skeletal/muscular tissue layer 30 are the largest, the fluid cells in the outermost skin tissue layer 34 are the smallest, and the fluid cells in the intermediate fat tissue layer are of an intermediate size somewhere between the other two cell sizes. The outermost skin layer is thus of higher cell resolution (greater number of cells per given unit area), giving the ability to better fine-tune the outer shape contour of the body suit, and for example enable replication of relatively fine skin surface details of a particular human body such as raised scars, moles, etc.

The outermost skin tissue layer is equipped with an array of sensors 52 each overlying a respective fluid cell in the outer cell array 46b of this layer. Each sensor 52 is operable to determine its location in three-dimensional space, for example in a three-dimensional X,Y,Z cartesian co-ordinate system. Inclusion of such sensors is beneficial in a number of non-limiting applications described herein in more detail below. The same sensors, or supplemental sensors accompanying same, may be operable to measure the exertion of external pressure against the exterior of the body suit, for example to evaluate tightness or identify pressure points in the worn position of a garment adorned over the body suit. The drawings show the sensors 52 as being externally mounted to the exterior surface 48 of the body suit 10, though they may alternatively be embedded or integrated within the flexible sheet or membrane that defines this exterior surface of the body suit and the outer envelope of the outer cell array of the outermost skin tissue layer 34. As another alternative, the sensors 52 may be mounted on the internal side of the outer envelope of the skin tissue layer's outer sensor array inside the fluid cells thereof. Examples where the sensors are embedded or integrated within the sheet or membrane include, but not limited to, flexible and stretchable physical plate sensors, sensing strips, pressure sensors, polymer film sensors, tape sensors, strain sensors, force sensors, piezoresistive sensors, piezoelectric sensors, FET-based sensors, tactile sensors, or combinations thereof. The embedded scenario includes embodiments in which sensors are enveloped within a separate stretchable constituent material of the sheet or membrane, whereas the integrated scenario includes embodiments in which the sensors themselves define respective areas of the sheet or membrane, whether these sensors are stretchable themselves, or are interconnected by spans of stretchable constituent material.

The exterior surface of the body suit is colored, or selectively colorable, in green or blue for enabling application of chroma key compositing techniques to video or still images taken of the body suit. In one embodiment, the material used for the exterior surface of the body suit may be produced in a green or blue color, or may be subjected to a subsequent dying or coating process after production to accomplish a suitable green or blue color. If the sensors are fully embedded in the material of the body suit's exterior surface, or are mounted internally of the body suit, then such green coloring of the exterior surface itself is sufficient to provide uniform green or blue color over the full exterior of the body suit. If the sensors are externally mounted to the body suit, then they can be produced in, or modified to attain, a matching blue or green color, or can be concealed by suitable green or blue covers matching the green or blue color of the exterior surface 48 of the body suit. As opposite to static coloring of the exterior of the body suit in a green or blue color, another embodiment may employ internal illumination sources (e.g. LEDs) mounted internally of the body suit beneath the exterior surface thereof and operable to disperse blue or green colored light into the an otherwise transparent or translucent material used for the outermost membrane of the body suit to selectively impart a blue or green color thereto when said illumination sources are activated. The internal illumination sources may be multi-color illumination sources capable of emitting differently coloured light, for example also enabling illumination of the outermost membrane of the suit in color tones approximating different human skin colors, and or any other tones in the full colour spectrum that may prove useful.

Having established a general description of the system, attention is now turned to potential applications for same, and additional details useful for such applications.

Referring again to FIG. 1, the remote user 26 of the system may be a customer who is shopping for an off-the-rack garment that will suitably fit their particular body shape, seeking production of a made-to-measure garment based on their particular body shape, or seeking modification of a new off-the-shelf garment or an existing garment from their own collection to better fit their current particular body shape. The remote user 26 uploads to the computerized controller a respective user data set including body measurement data representative of their particular body shape, for example as generated by use of a 3D scanner 60 to perform a full-body scan containing a comprehensive set of measurement data points providing an accurate shape profile of the user's entire body. The 3D scanner may be embodied by either a dedicated 3D scanner, whether laser or photogrammetry based, or a 3D scanner application running on a general-purpose computing device with an appropriate image capture device for photogrammetry, for example on a camera-equipped smartphone, camera-equipped tablet computer, camera-equipped laptop computer, or a desktop or laptop computer to which an external image capture device (e.g. webcam) is connected. While use of a 3D scanner is preferred for optimal accuracy, the user may alternatively upload a partial data set based on physical human-performed measurement of their body according to a prescribed set of standardized measurement types. The computerized controller can extrapolate an approximation of the user's particular body shape from this less comprehensive user data set, and store the extrapolation as a comprehensive user data set.

The user data set may optionally also include skin color data in instances where the body suit is equipped to adopt different exterior skin colors, as contemplated herein above. The computerized controller may again employ a cloud computing or distributed network structure, and thus may include an intermediate server to which the user data is uploaded by the remote user, and from which the local computer 20 collects the user data. The intermediate server may be a cloud server or dedicated server.

The computerized controller maps body measurement data points from the comprehensive user data set to an array of respective locations on the exterior of the body suit, each of which preferably corresponds to a respective one of the outermost array of fluid cells 46*b* that most closely underlies the exterior surface 48 of the body suit. In embodiments where the body suit is equipped with array of sensors 52 each overlying a respective fluid cell of the outer skin tissue layer's outer cell array, each of the mapped body measurement data points is thus assigned to the location at which a respective one of the sensors resides. The pressurized fluid source 12 is activated, and the computerized controller controls opening and closing of select cell control valves 50 of the fluid cells in one or more tissue layers and cell arrays of the body suit 10 in a calculated manner so that each respective location on the exterior surface 48 of the body suit is forced outward by the expansion of one or more fluid cells underlying that location to an appropriate point in 3D space that matches the corresponding body measurement data point mapped to that location from the comprehensive user data set. Controlled expansion of select fluid cells in this manner thus imparts an outer shape contour to the exterior surface 48 of the body suit that matches the scanned or extrapolated body shape of the remote user.

At this point, the body suit can be used as a mannequin for customized production of a made-to-measure garment to the particular body shape of the remote user, for modeling of an off-the-shelf garment to check the fit of same against the particular body shape of the remote user, or for customizing an existing garment to the particular body shape of the remote user. With the made-to-measure garment, unmodified off-the-shelf garment or customized garment adorned over the body suit 10, video images or still 2D or 3D images may then be captured of the body suit and adorned garment using the on-site digital imaging device 24 for the purpose of enabling viewing of such images by to the remote user 26 so that they can visually assess the fit of the garment on their particular body shape.

Rather than providing the remote user with copies of or access to the raw unprocessed images of the body suit and garment, post-production processing of the imagery can be performed using chroma key compositing techniques to omit any visible portions of the body suit 10 that were not concealed by the garment, as enabled to the novel application of green or blue coloring of the exterior surface of the body suit 10. By capturing the original images of the body suit 10 and garment in front of a green or blue screen that matches the green or blue color of the body suit's exterior, chroma key compositing techniques can be used to provide an isolated image of the garment over any desirable background image. The resulting composite image may be sent directly to the remote user 26, for example by email or SMS, or be simply be made available for viewing or download by the user, for example by posting the images on an internet website accessible by the remote user, optionally under password protection or other secured access technique to prevent viewing by the general public or other users. As an alternative to green/blue illumination of the body suit exterior for chroma key compositing purposes, the internal illumination sources of the body suit may be controlled by the computerized controller in a manner simulating the remote user's skin color, if skin color data is present in the user data set.

Similar use of chroma key compositing techniques with the green or blue colored body suit can be used to created isolated garment imagery even in instances where the fluid-adjustable shaping of the body suit was not used specifically to emulate the body shape of a particular remote user. For example, retailers or designers looking to post online images of their clothing catalogue in a manner accurately reflecting their shape when worn, but without having to either hire a human model or have a mannequin visible in the final image, can similarly take advantage of the green or blue colored body suit to enable post production isolation of the garment from the body suit. From this, it will be appreciated that externally blue or green coloring of a mannequin can beneficially exploited for these or other purposes regardless of whether the body suit is specifically adjusted to emulate a customer-specific body shape.

When equipped with the sensors 52, the body suit 10 can also be used for the purposes of testing the maximum allowable external dimensions of a garment, by placing the garment onto the body suit, and then expanding same to an eventual point of garment failure. Recordal of the sensor positions during this process can thus be used to gauge the maximum body dimensions that will properly fit the garment without risking stress of garment to the point of failure. In another exemplary application making beneficial use of the sensors, readings of uniform pressure among the array of sensors may be used to gauge an optimal fit of a garment for a particular body size and shape during design of such garment, or gauge the optimal body size and shape range for which an already designed garment is best suited.

The optional sensors 52 may also be useful for other purposes. In one embodiment, the sensors 52 can be used to provide feedback on the outer shape contour achieved by the selectively variable inflation of the various fluid cells in the suit. Accordingly, the wired or wireless connection 22 between the local computer of the computerized controller and the body suit 10 may be operable to communicate both outgoing control signals from the computerized controller to the cell control valves 50 of the body suit 10, and also feedback signals from the sensors 52 of the body suit 10 back to the computerized controller 18. The computerized controller stores a body data file for a targeted human body shape the suit is intended to replicate, for example based on the comprehensive user data set of a remote user, and maps the body measurement data points from this body data file to the array of sensors 52 on the body suit. The sensors thus may be used to provide feedback to the local computer 20 on when the location of each sensor has reached an appropriate position in space that matches the respective data point from the body data file of the targeted human body shape, at which point the valves of the fluid cells in the different tissue layers can all be closed to maintain the properly achieved outer shape of the body suit. Alternatively, positional feedback from the sensors on the attained outer shape of the body suit may be omitted, as the system may alternative be calibrated so that control of the valve timing alone is sufficient to provide acceptable body shape accuracy. Where a feedback mechanism is employed, inclusion of a return/exhaust/drain line may be beneficial to enable application of a low pressure vacuum or suction source thereto to enable targeted collapse/deflation of cells when a sensor has been found to overshoot its targeted position matching the respective body measurement data point. With the cell control valves of other cells held closed, application of such suction enables full or partial collapse of one or more cells underlying the over-expanded area of the body suit's exterior.

Figure 5:
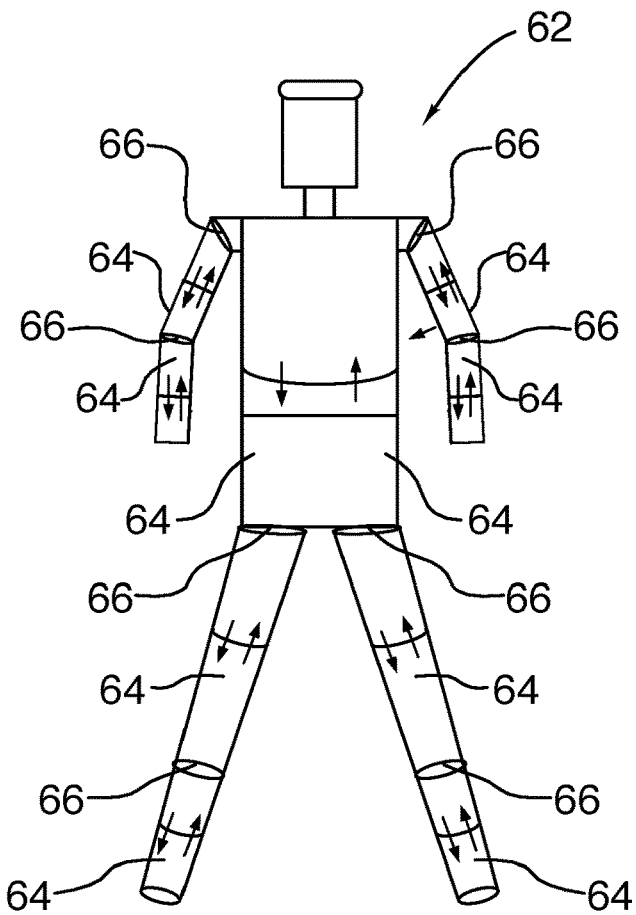
FIG. 5 is a schematic elevational view of a core body over which the inflatable body suit can be disposed in order to cooperatively create a shape-adjustable mannequin.

FIG. 5 shows an example of a core body 62 over which the fluid expandable body suit 10 may be adorned to cooperatively form an internally reinforced shape-adjustable mannequin. Arrows are used to illustrate the optional inclusion of telescopically extendable and collapsible segments 64 in the arms, torso and legs to enable size and shape adjustment of the core body. Articulating joints 66 may be employed between the segments at the shoulders, elbows, hips and knees of the core body to enable placement of the mannequin in various positions to test the fit and/or failure of a garment in varying position of the emulated body shape.

Figure 1A:
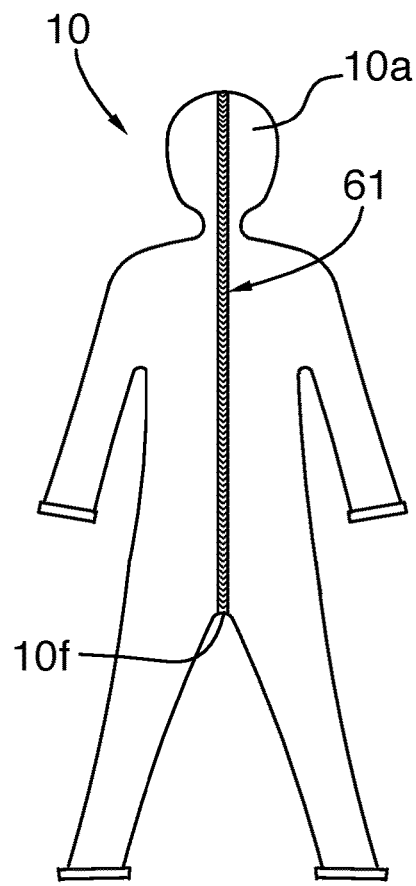
FIG. 1A is a rear elevational view of an inflatable body suit from the system of FIG. 1.

As shown in FIG. 1A, to enable placement of the hollow central space 28 of the fluid expandable body suit 10 over the core body 62, the body suit 10 may include a split 61 therein running from the groin 10f to the crown of the head 10a, preferably up the rear side of the torso. All the tissue layers 30, 32, 34 are seamed closed along both sides of the split, and suitable fastening elements (e.g. mating zipper halves) are attached to the body suit on both sides of the split to enable selective closure of the split up the back of the core body 62 once the core body has been received legs-first downwardly into the body suit via the rear split. As non-limiting examples, the core body may employ a wire mesh construction for its body segments, or a hollow or solid plastic construction for same.

Figure 2:
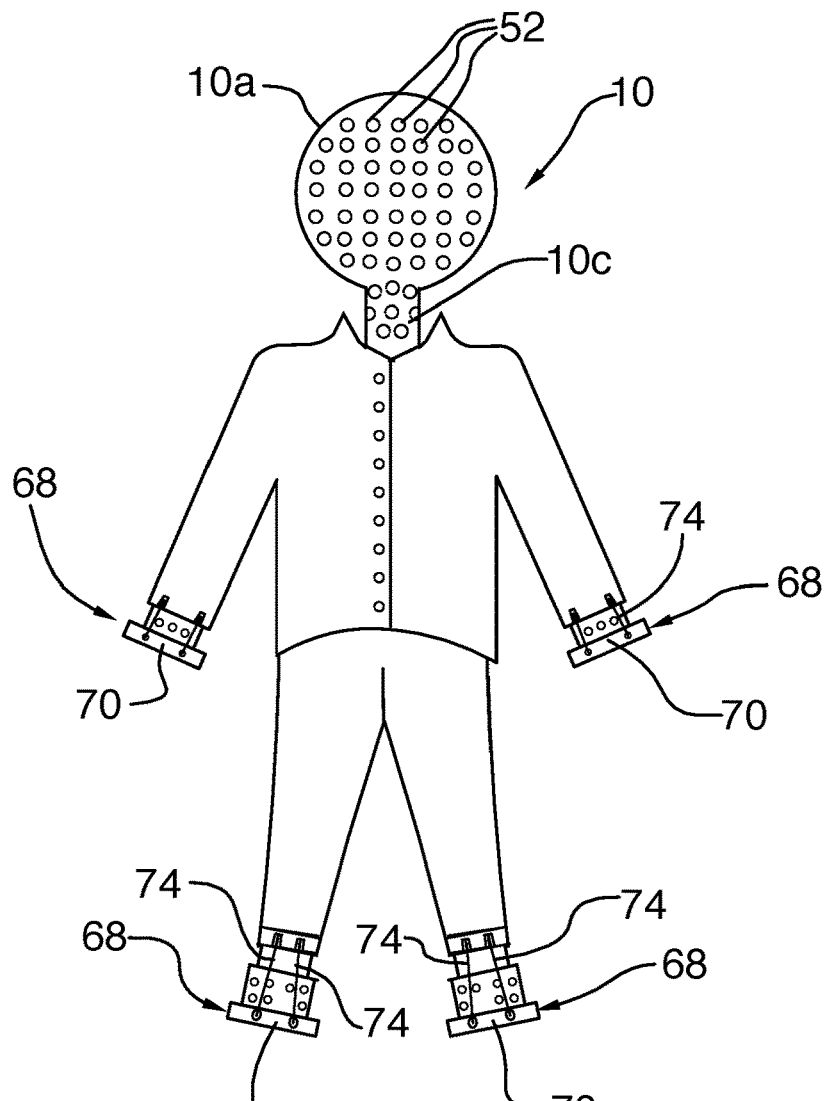
FIG. 2 is a front elevational view showing garments adorned on the inflatable body suit from the system of FIG. 1.
Figure 2A:
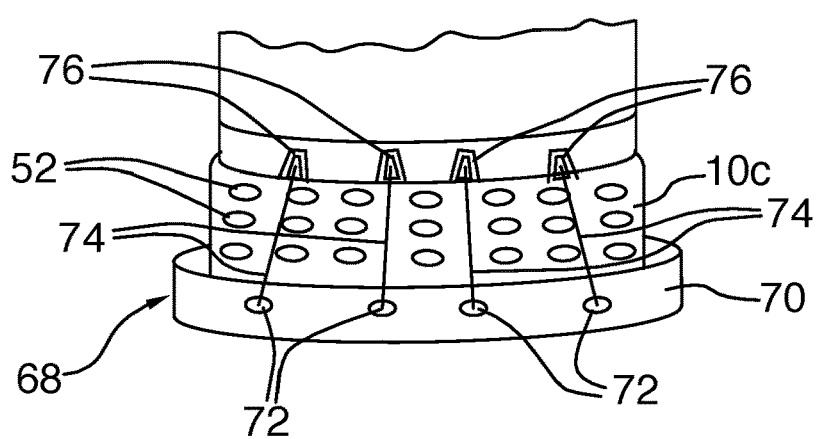
FIG. 2A is a partial closeup view of the garments and inflatable body suit of FIG. 2, illustrating a tether arrangement by which the garments are secured in position on the body suit.

FIG. 2 illustrates mounting of tether anchors 68 at distal hand and foot ends of the arms and legs of the body suit 10, for example by removable coupling of these tether anchors 68 to the distal hand and foot ends of the arms and legs of the core body 62 of FIG. 5 once received inside the hollow central space of the body suit 10. Alternatively, the tether anchors may be affixed to the arms and legs of the body suit itself. In the illustrated example, each tether anchor is a rigid collar 70 having a series of anchor holes 72 opening radially through a circular outer ring wall of the collar at angularly spaced positions therearound. A set of tether cords 74 are connected to each tether anchor, for example by tying of lower ends of the tether cords respectively through the anchor holes of the collar. A second end of each tether cord has an adjustable clip or other releasable fastener 76 attached thereto by which the tether cord can be temporarily and releasably coupled to a sleeve, pant, cuff or hem of an arm or leg worn garment (shirt, blouse, sweater, jacket, pants, shorts, skirt, dress, etc.). This way, the tether cords 74 holds the garment in place to prevent or limit "riding up" of the garment on the arms or legs of the body suit 10 during fluid expansion thereof in instances where garment has been, or must be, adorned on the body suit prior to expansion thereof (e.g. during the aforementioned point-of-failure testing). For each tether anchor, multiple sets of tether cords of varying length may be provided, from among which a suitable set may be selected based on a sleeve or leg length of a given garment being tested. Alternatively, a single set of relatively long tether cords may be provided for each tether anchor, and an appropriate effective length of the tether cords is set for a particular garment simply by selecting the point on each tether at which it is tied through a respective anchor hole 72, or at which it is otherwise releasably fastened to the to the tether anchor at a respective anchor point thereon.

Figure 6:
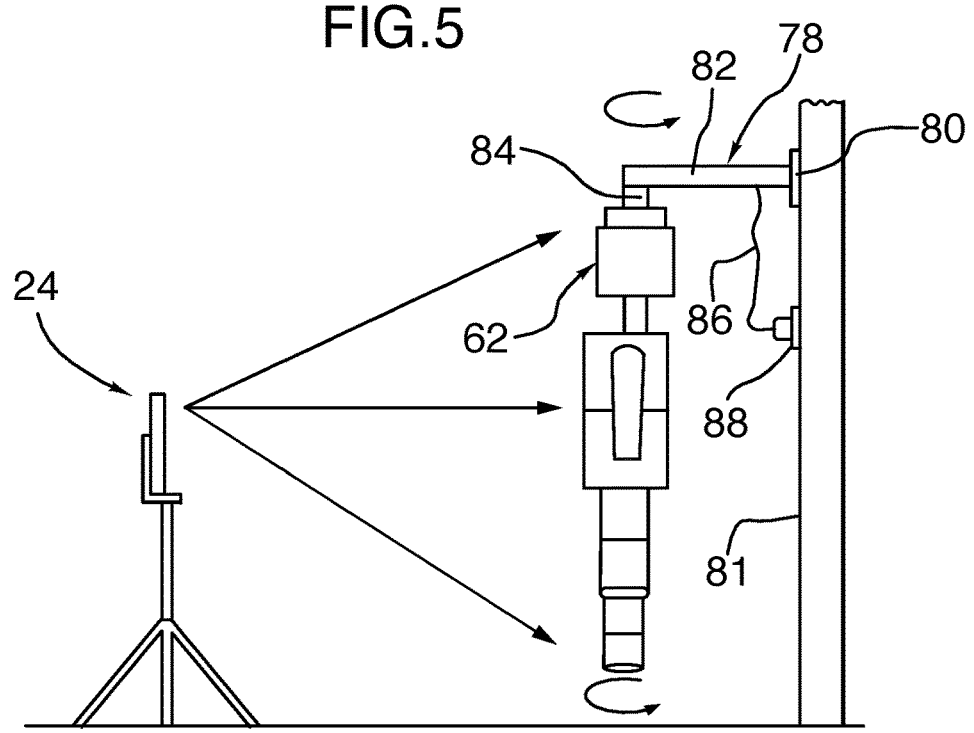
FIG. 6 is a schematic elevational view of a wall-mounted rotational support carrying the core body of FIG. 5 to enable rotatable viewing/scanning of the shape-adjustable mannequin.

FIG. 6 illustrates suspension of the core body 62 of FIG. 5 from a wall-mounted rotational support 78 having a mounting bracket 80 affixed to a wall surface 81 at a spaced elevation above ground or floor level. The height at which the mounting bracket is affixed to the wall is selected to exceed a maximum head-to-toe height of the core body. A support arm 82 reaches horizontally forward from the base 80 and away from the wall surface. A motorized spindle 84 at or near a distal end of the support arm furthest from the base hangs downward therefrom and couples to the head of the core body 62 in order to rotatably carry the core body in a hanging position with its legs elevated off the ground or floor surface. A power cord 86 coupled to the spindle motor through the support arm 82 hangs downwardly from the mounting bracket for plugging into a conventional AC outlet 88, preferably installed on the same wall near the mounting bracket. When energized, for example via a manual or remote-controlled on/off power switch incorporated into the rotational support, the motorized spindle 84 rotates the hanging core body 62 slowly about a vertical axis through a full 360-degree rotation.

Prior to hanging of the core body 62 from the rotational support, the fluid expandable body suit 10 is fitted over the core body, and expanded to a targeted size and shape by the computerized controller 18 and pressurized fluid source 12 of FIG. 1, whereby the core body 62 and body suit 10 cooperatively define an internally reinforced shape adjustable mannequin occupying a temporarily customized shape. With the targeted shape achieved, the cell control valves 50 of the fluid cells 40 in the body suit default to a closed state in the absence of electrical valve-opening signals from the computerized controller 18, whereby each fluid cell remains in its given state of expansion or collapse to maintain this targeted outer shape of the body suit.

If not already adorned over the body suit 10, a garment is placed thereover, and the mannequin is hung from the wall-mounted rotational support via the head of the core body. The digital imaging device 24 is placed on the side of the suspended mannequin opposite the wall, and is operated during rotation of the suspended mannequin to capture still 2D images of the body suit body and garment from various angles, or to capture a full 3D image scan around an entirety of the suspended mannequin. The captured images can then be chroma key composited to omit any exposed blue or green areas of the body's suit's exterior. The wall surface 81 in the background may be similarly colored or screened in green or blue to enable additional chroma key editing of the background imagery behind the garment.

Figure 7:
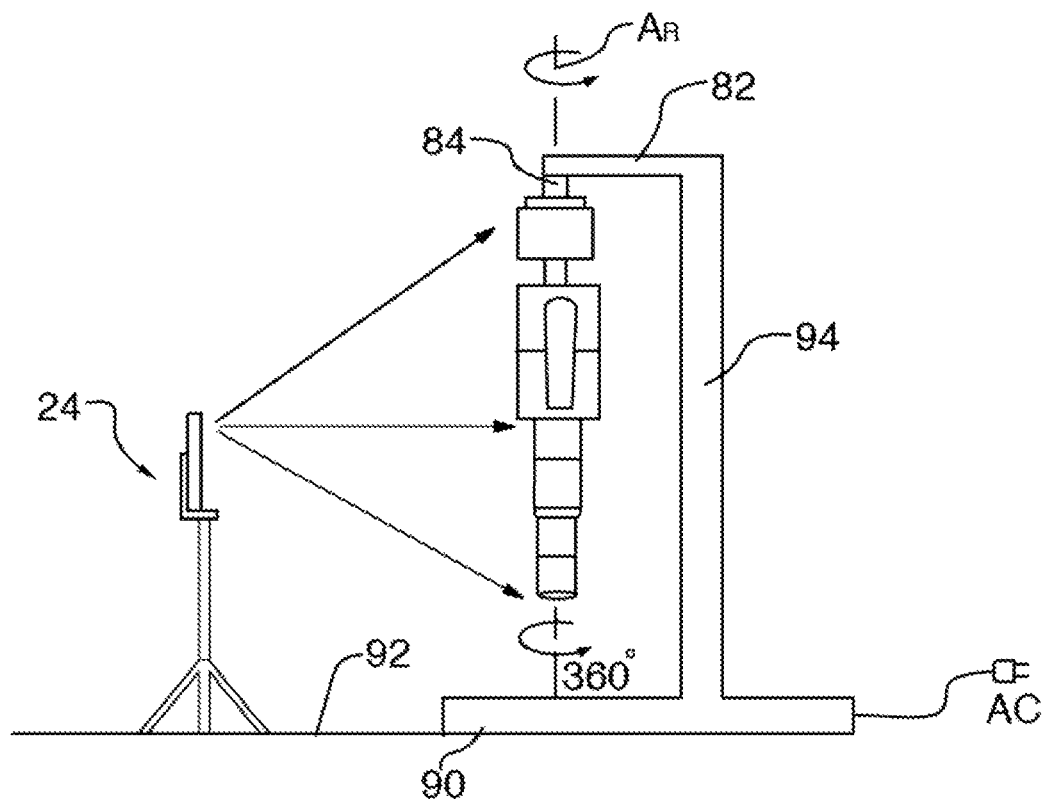
FIG. 7 is a schematic elevational view of the core body of FIG. 5 rotatably supported in a similar manner by a stand-alone rotational support.

FIG. 7 illustrates a stand-alone rotational support of similar design and purpose as the wall-mounted rotational support of FIG. 6, but with a base 90 for sitting atop a ground or floor surface 92, and an upright stanchion 94 that carries the support arm 82 in elevated relation above the base to hang the mannequin in spaced relation above the base. The power cord 86 in this instance is routed down the stanchion 94 to the base 90 from the support arm 82 in order to plug into a conventionally placed AC outlet near ground/floor level.

Figure 8:
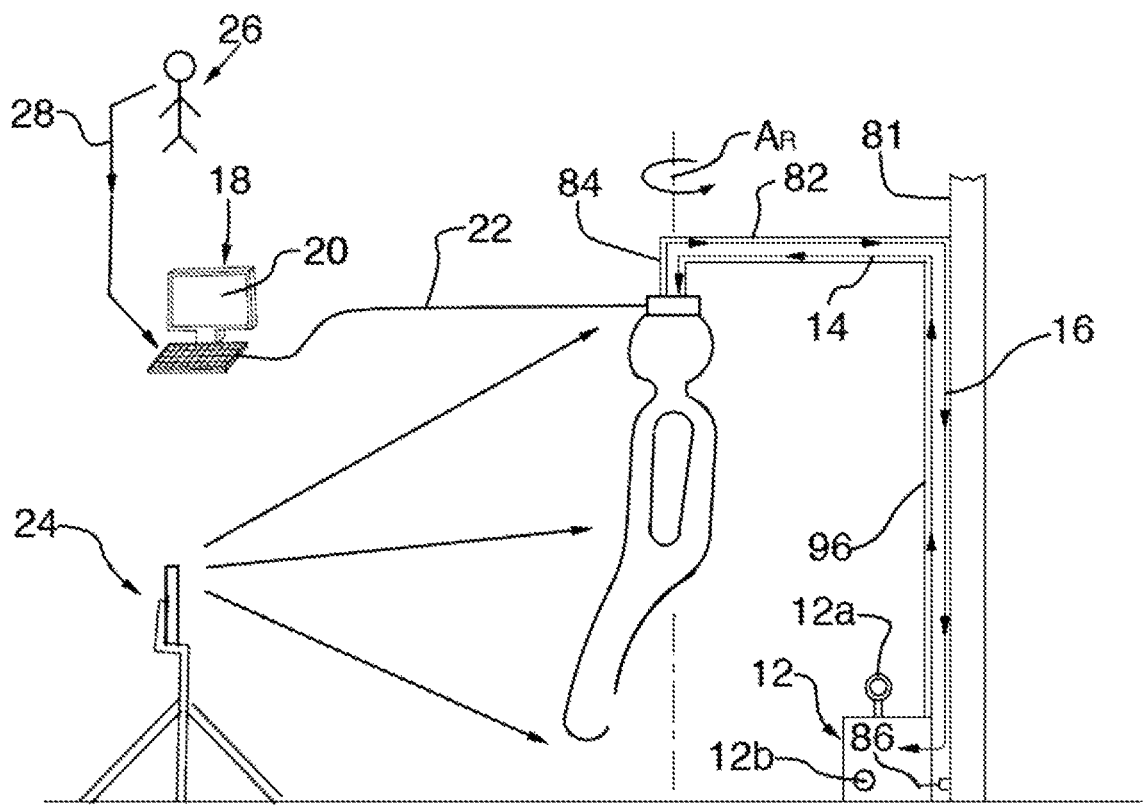
FIG. 8 is a schematic elevational view of a variant of the wall-mounted rotational support of FIG. 6, which incorporates additional elements for inflation of the body suit of the shape-adjustable mannequin.

FIG. 8 illustrates a wall-mounted rotational support of similar design and purpose as at that of FIG. 6, but modified to replace or augment the smaller mounting bracket 80 of FIG. 6 with a length of channel 96 that runs up the wall surface from near ground level. Fastened to the wall, this channel 96 once again carries the support arm 82 in cantilevered fashion reaching outward from the wall, but also provides a concealed routing path for a fluid supply line 14 that runs upwardly through the channel 96 into the support arm 82, and then continues onward therethrough or therealong to the motorized spindle 84. Here, the fluidly supply line 14 turns downwardly along the rotational axis $A_R$ of the spindle into the mannequin, where the supply line 14 feeds into the fluid channel sub-layer 30a, 32a, 34a of each tissue layer in the body suit 10 to enable fluid expansion of the body suit while in a rotatably hanging position on the rotational support. FIG. 8 shows a return, exhaust or drain line 16 being routed alongside the supply line 14 through the channel 96, support arm 82 and spindle 84, though as mentioned with reference to FIG. 1, such a line may optionally be omitted in the instance of an open loop pneumatic circuit using ambient air as its fluid source.

The pressurized fluid source 12 is placed or mounted at or near ground level at or near the bottom end of the channel 96, where the fluid supply line 14 connects to the pressurized fluid source. Like the pressurized fluid source of FIG. 1, that shown in FIG. 8 may be an air compressor with a pressure gauge 12a and pressure relief valve 12b. A single power cord 86 may be used to power both the motorized spindle and the pressurized fluid source 12, or one dedicated power cord for the spindle could be routed down the channel to emerge at a similar location to a separate dedicated power cord emerging from the pressurized air source. The variant of FIG. 8 thus improves on the more basic rotation-only structure of FIG. 6 by incorporating fluid-handling components into the rotational support itself. By routing the fluid into the body suit on or along the rotational axis $A_R$ from an overhead support arm, the shape of the body suit can be adjusted between rotations without having to connect and disconnect fluid lines to and from the body suit. Similar benefit may be realized from variants in which the mannequin is carried on an underlying turntable or spindle that rotates the mannequin from below, and similarly routes the fluid line(s) on or closely alongside the rotational axis $A_R$.

Figure 9:
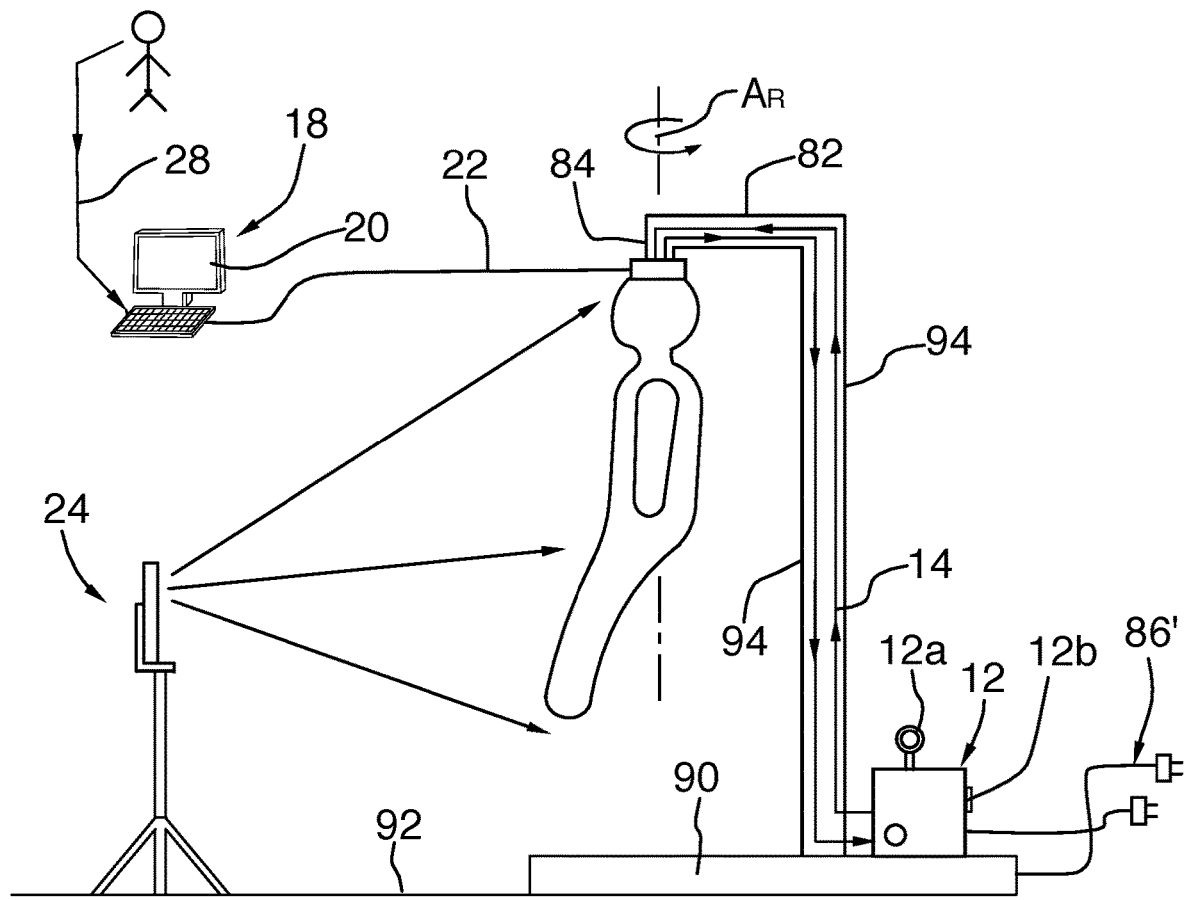
FIG. 9 is a schematic elevational view of a variant of the stand-alone rotational support of FIG. 7, which incorporates additional elements for inflation of the body suit of the shape-adjustable mannequin.

FIG. 9 illustrates a stand-alone rotational support combining elements of the fluid-handling wall-mounted rotational support of FIG. 8 and the rotation-only stand-alone rotational support of FIG. 7. Like that of FIG. 7, the rotational support of FIG. 9 features a base 90 for sitting atop the ground or floor surface 92, and an upright stanchion 94 that carries the support arm 82 in elevated relation above the base to hang the mannequin in spaced relation above the base. The pressurized fluid source 12 is placed or mounted atop the base 90, and the fluid supply line (and optional fluid return/drainage/exhaust line) are routed through or along the stanchion 94 and the support arm to the motorized spindle, where the line(s) connect to the body suit on or along the rotational axis $A_R$ of the spindle 84. FIG. 9 shows the dual power cord configuration 86' mentioned above with reference to FIG. 8, but again, a singular shared power cord may alternatively be used.

In the event the image capturing device 24 is a photogrammetry based 3D scanner (whether using dedicated scanning hardware, or a scanning software application on a general purpose camera-equipped or camera-connected computing device), or if the image capturing device 24 is substituted by a laser based 3D scanner, this 3D scanner may be used for the same feedback purposes described above with relation to the sensors 52, where the 3D scanner performs a 3D scan of the body suit during or after expansion thereof to the targeted body shape, and sends measurement data from this scan to the computerized controller 18 for the purpose of confirming or fine-tuning the accuracy of the final body shape of the expanded body suit. The body suit may still be equipped with sensors 52 even where a 3D scanner is used for feedback purposes, whether to serve as a redundant or additional feedback mechanism, or to enable use of the body suit for other sensor-requiring purposes, such as those contemplated herein above. For other applications, the sensors may be omitted, with feedback reliance instead being placed solely on the use of a 3D scanner.

Figure 10:
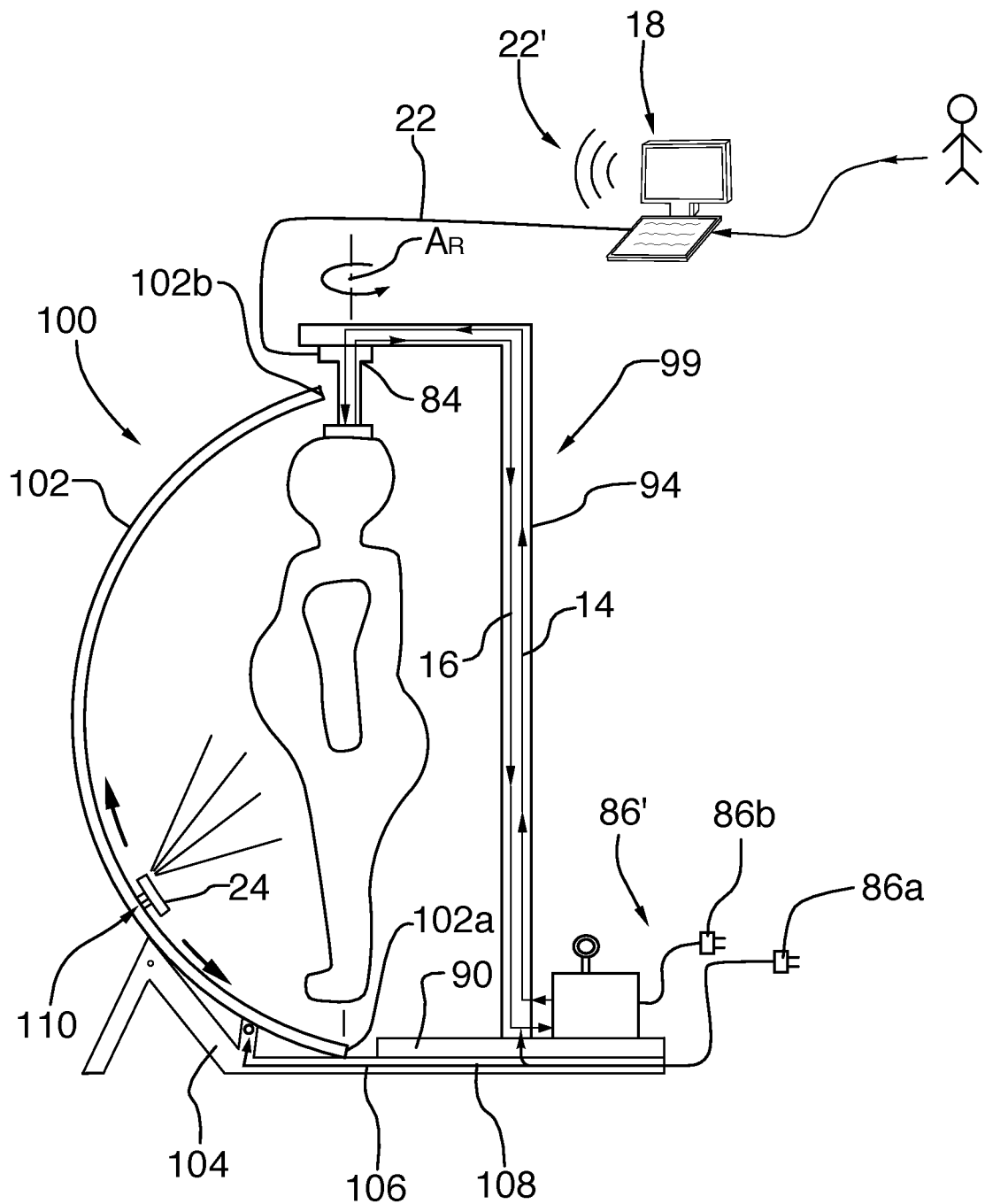
FIG. 10 is a schematic elevational view of another variant of the stand-alone rotational support of FIG. 9, which adds an additional image capture guidance system to enable comprehensive three-dimensional imaging of the body suit and any adorned garments thereon.

FIG. 10 illustrates a further variant of the self-standing rotational support structure of FIG. 9. The rotational support structure 99 once again features a base 90 for sitting atop the ground or floor surface 92, an upright stanchion 94 that carries the support arm 82 in elevated relation above the base to hang the mannequin in spaced relation above the base and underlying floor or ground surface, a fluid source 12 placed or mounted atop the base 90, and a fluid supply line (and optional fluid return/drainage/exhaust line) routed through or along the stanchion 94 and the support arm to the motorized spindle, where the line(s) connect to the body suit on or along the rotational axis $A_R$ of the spindle 84. FIG. 10 shows the dual power cord configuration 86' mentioned above with reference to FIG. 9, but again, a singular shared power cord may alternatively be used. For the purpose of ensuring comprehensive 3D imaging of the garment-adorned mannequin, the rotational support structure 99 is supplemented by the addition of an image capture guidance system 100 for movably supporting the digital imaging device 24, which may be embodied in the form of a digital camera, camera-equipped smartphone or camera-equipped tablet computer. This way, the digital imaging device 24 can be moved relative to the mannequin to acquire images thereof from various predetermined vantage points relative thereto, all in an electro-mechanically controlled fashion and with the digital imaging device securely supported at each vantage point to ensure image stability.

By comparison, using a handheld digital camera, camera-equipped smartphone, or camera-equipped tablet computer for 3D object data capture can be extremely challenging for a human operator. The varying rates of user and object movement, the non-linear human movement mechanics involved (shakiness), and the angle/access of image capture of the desired object can all pose significant problems for a human operating the digital image capture device. The human operator must make multiple passes, and possibly at various angles from awkward positions to capture images on a human, model or mannequin (between the legs, crotch area, underneath extended arms or armpits, on top of shoulders, top of head, etc.). Visual feedback cues as to the success or failure of the data capture may be delayed until post data capture production viewing is possible. Real time feedback may not be possible at all, and even when possible, viewing real time feedback on the apparatus interferes with the operator focus needed to perform the actual data capture process. This can be both time consuming and frustrating for the person operating the camera/smartphone device.

The image capture guidance system 100 features an upright track 102 placed in proximity to, and preferably attached to, the rotational support structure 99. The track 102 has a lower end 102a situated at or near ground/floor level, an opposing upper end 102b situated at or near the elevation of the motorized spindle 84 of the rotational support structure in a same vertical plane occupied by the lower end 102a of the track. The track does not deviate from this vertical plane in its longitudinal span between its opposing upper and lower ends. In the preferred embodiments, such as that shown in FIG. 10, the track has a curved shape, for example spanning a circular or elliptical arc, and is oriented to face a concave side of the track toward the rotational axis $A_R$ of the rotational support structure 99 so that this concave side of the track faces the mannequin when hung from the rotational support structure 99. The bottom end 102a of the curved track 102 resides at or near the point at which the rotational axis $A_R$ of the rotational support structure 99 intersects the ground or floor surface 92, while the opposing upper end 102b of the curved track resides at equal or near elevation to the motorized spindle 84 of the rotational support structure, and in close proximity to the front side of the spindle, i.e. the side thereof furthest from the stanchion 94. In the illustrated example, this places the upper end 102b of the track 102 at or shortly below the distal end of the support arm 82 of the rotational support structure 99, and above the head of the mannequin suspended from the spindle. Meanwhile, the ground/floor-adjacent lower end 102a of the track resides at an elevation near, and preferably slightly below, that occupied by the feet of the suspended mannequin.

A track support frame 104 is attached to a lower half of the track 102 at a distance forwardly from the track's lower end 102a to prop the track 102 into its upright position in front of the rotational support structure 99. A ground-level connector 106 of the image capture guidance system 100 preferably joins the guidance system 100 to the base 90 of the rotational support structure 99 in at least a mechanical fashion, thereby lending additional stability to the track 102 and attached support frame 104, and also acting to positively position the track 102 at a predetermined position and orientation relative to the rotational support structure 99. In the illustrated example, the ground level connector 106 is attached to the track support frame 104 at a rear side thereof nearest the base 90 of the rotational support structure, and spans rearwardly from the track support frame 104 to join with the front side of the base 90.

Figure 10A:
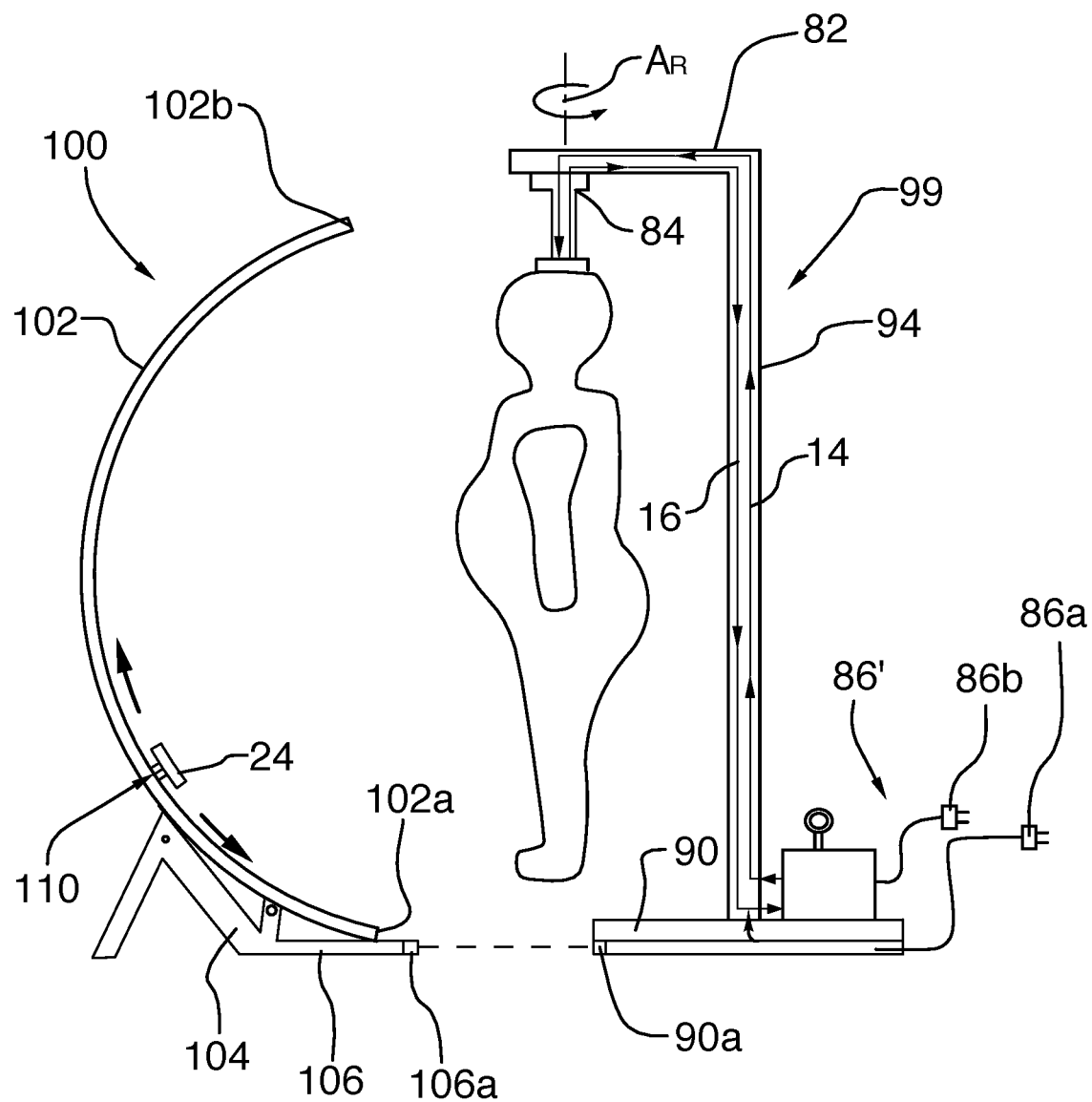
FIG. 10A is an exploded view of the rotational support and image capture guidance system of FIG. 10.

This ground-level connector 106 may form a permanent connection irremovably affixed to the base 90. More preferably, the ground-level connector 106 is instead a selectively attachable/detachable connector allowing the image capture guidance system 100 to be optionally attached and detached to and from the rotational support structure 99. The latter option enables the image capture guidance system 100 to be sold as an optional add-on accessory to a standardized rotational support structure 99, and allows separation of the two units (i.e. the rotational support structure 99, or "rotation unit"; and the image capture guidance system 100, or "guidance unit") into separate components for more compact storage and transport when not in use. FIG. 10A illustrates optional separation of the guidance unit 100 from the rotation unit 99, and reveals a rear terminal coupler 106a on the connector 106 that is matable with a corresponding front terminal coupler 90a on the base 90 of the rotation unit.

These couplers 106a, 90a, in additional to establishing a mechanically-fastened connection between the two units, may also serve to establish electrical connections therebetween, whether for the purpose of powering electronic componentry thereof, and/or controlling operation of such componentry. For example, the couplers 106a, 90a may each comprise one of either a male plug or a female socket with suitable electrical contacts therein for establishing electrical closure of a shared power and/or communication bus of the two units. FIG. 10 schematically illustrates a shared power bus 108 running through the connector 106 from a shared power cord 86a of the rotational support structure 10, whereby plugging of said shared power cord 86a into a mains AC power outlet 88 is operable to power electric motors of both units 99, 100 through this shared power bus. While the illustrated example employs a dual power cord configuration 86' featuring a separate power cord 86b for the pressurized fluid source 12, the pressurized fluid source may alternatively be powered through the same shared power bus 108 and cord 86a as the electric motors.

While the illustrated embodiment features a ground-level connection 106 between the track support frame 104 and the base 90 of the rotational support structure 99, the track 102 itself, at or near the lower end thereof, may additionally or alternatively connect to the base 90 of the rotational support structure 99. While the illustrated embodiment employs only a ground-level connection 106, one or more additional connections may be made at more elevated locations along the track. For example, the upper end of the track 102b, being situated in proximity to the distal end of the support arm 82, may be connected thereto in order to further support the track 102 in its predetermined, stable position relative to the rotational support structure 99.

Figure 11:
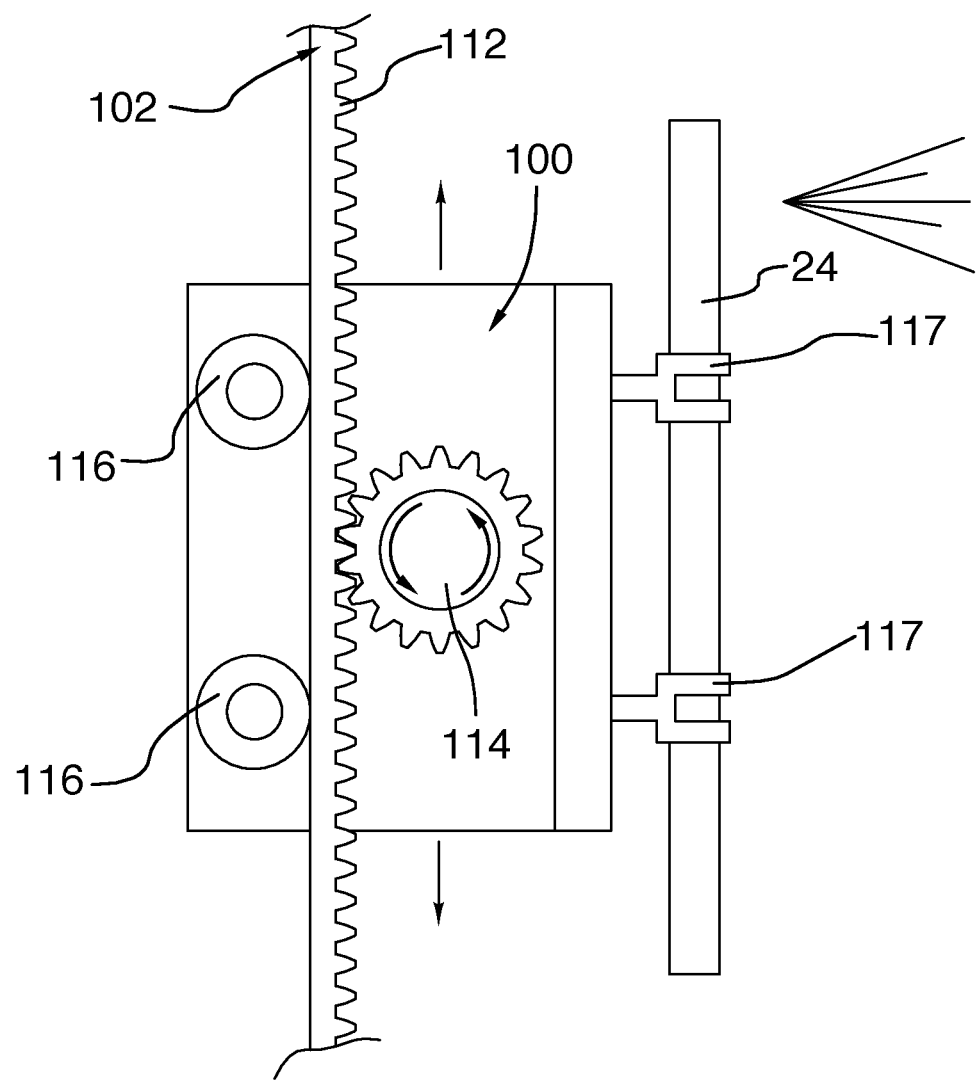
FIG. 11 is a schematic cross-sectional view of a track of the image capture guidance system, illustrating a motorized carriage that travels up and down the track with a digital imaging device carried thereon to capture images of the garment-adorned body suit from different vantage points.

The image capture guidance system features a carriage 110 configured to travel up and down the track 102 on the curved longitudinal path thereof between the track's upper and lower ends. FIG. 11 shows one non-limiting example for implementing such carriage movement along the track, but omits the track curvature in the interest of illustrative simplicity. The illustrated track 102 features rack teeth 112 on the rear concave side thereof that faces the rotational support structure 99 and suspended mannequin. The carriage 110 is a motorized carriage featuring at least one motor-driven gear 114 that intermeshes with the rack teeth 112 of the track. An opposing front convex side of the track 102 that faces away from the rotational support structure 99 and suspended mannequin features a smooth guide surface against which one or more idling guide rollers 116 of the carriage 110 ride in rolling fashion so that the carriage's motorized gear 114 is maintained in operable engagement with the rack teeth 112, thereby preventing gravitational fall of the carriage 110 from the track at any point of its curvilinear travel therealong. With one motorized gear 114 on the toothed side of the track 102 and two guide rollers 116 on the opposing side of the track, or vice versa, the carriage 110 is also maintained in a predetermined orientation relative to the track 102.

A rear side of the carriage 110 facing toward the rotational support structure 99 and the suspended mannequin features a device holder 117 configured to removably hold a digital camera, smartphone, tablet computer or similar digital imaging device 24 in a position facing the camera lens (and flash, if so equipped) thereof rearwardly away from the track 102 and toward the rotational support structure 99 and rotatably suspended mannequin. In addition to the rack teeth 112, the track may feature electrical contact rails (not shown) against which electrical contacts (not shown) of the carriage are biased for slidable, electrically conductive contact with the rails to provide power and/or control signals to the gear motor of the carriage, thereby controlling rotation of the motor-driven gear 114 and the carriage's resulting travel along the track.

As described above for the other variants of the rotational support structure 99, the computerized control system 18 is communicably connected thereto, for example by USB or other wired or wireless connection 22 between the local computer 20 and the rotational support structure. In the example where a shared communication bus of the rotation and guidance units 99, 100 connects to both the motorized spindle 84 of the rotation unit and the electrical contact rails of the track 102, the computerized control system's singular connection to the rotation unit 99 is sufficient to not only control rotation of the mannequin, but also control movement of the carriage 110 and the attached digital imaging device 24 along the track 102. However, it will be appreciated that separate connections from the computerized control system 18 to the rotation and guidance units 99, 100 may alternatively be employed. While the schematic illustration in FIG. 10 shows the USB or other wired connection 22 being made near the top of the rotation unit 99 in direct or near-direction connection to the motorized spindle 84 thereof, this is merely one non-limiting example, and wired connection between the computerized control system 18 and the rotation unit 99 may be accomplished at any variety of locations thereon, for example closer to ground level, whether at the base 90 or at some intermediate elevation on the stanchion 94 part way between the base 90 and the support arm 82. It will also be appreciated that the two units 99, 100 need not share a common power bus fed by a shared power cord 86a, and may instead each have a separate dedicated power cord.

The computerized control system 18 is also communicably connected to the digital imaging device 24, preferably by way of a wireless connection 22'. However, wired connection may alternatively be employed, provided that appropriate wire management is adopted to prevent any such wired connection from either entanglement, or interference with carriage movement along the track. By sending motor control signals through the shared communication bus of the rotational and guidance units to both the motorized spindle 84 of the rotational unit 99 and the motorized carriage 110 of the guidance unit 100, and by sending image capture commands to the digital imaging device 24, the computerized control system 18 is operable to control relative timing between rotation of the mannequin, travel of the digital imaging device 24 up and down the track 102, and capture of images by the digital imaging device 24. Software for triggering image capture by one or more digital imaging devices from a separate computerized device (in this case, the computerized controller 18) is already known in the art and commercially available, and thus is not described herein in further detail.

The rotational unit 99, guidance unit 100, connected controller 18, and separate general-purpose digital imaging device 24, when installed in holder of the carriage 110, thus collectively form a system operable to capture comprehensive three-dimensional imagery of the rotatably suspended mannequin and any garments adored thereon for modeling purposes. With the mannequin suspended on the rotation unit 99, and having been adorned with one or more garments, and previously or subsequently inflated by the computerized control system 18 to an appropriate degree at appropriately targeted cells according to the stored measurement data points of a particular user's body profile stored in the computerized control system 18, the image data capture sequence can be initiated.

First, a digital camera, camera-quipped smartphone, camera-quipped tablet or other digital imaging device 24 is secured in the device holder 117 of the carriage 110. A motor control circuit on the carriage 110 selectively provides the carriage motor with operating voltage from the shared power bus 108 via the electrical contact rails of the track 102, or a subset thereof if the electrical contact rails include both power distribution and communication rails. Selective energization of the carriage motor from these power distribution rails by the motor control circuit is dictated by input control signals, for example received thereby via such a communication rail. Alternatively, the electrical contact rails may consist solely of the power distribution rails, with control signals instead being transmitted to the motor control circuit of the carriage 110 by other means, for example by wireless communication with the computerized controller 18 if the carriage is equipped with a wireless receiver or transceiver. As a further alternative, wired power and/or control connections to the carriage 110 may be employed in place of electrical contact rails and/or wireless control communication, provided again that suitable wire management is adopted. In another alternative, the carriage 110 may employ an on-board battery to power its motor and motor control circuit, and wireless receiver/transceiver if so equipped, provide that the energy requirements of the motorized conveyance of the carriage and associated components carried thereon are sufficiently low to make battery-based implementation practical. In such implementations, the electrical contact rails and shared power bus may be omitted.

Through automated control of the motorized carriage 110 by the computerized controller 18, the digital imaging device 24 is driven repeatedly up and down the track 102 at a controlled, and preferably uniform, rate of speed, while the computerized controller simultaneously triggers continuous or periodic image capture by the digital imaging device 24 on an ongoing basis during this repeated travel up and down the track 102 between the lower and upper ends 102a, 102b thereof. In each such vertical pass of the digital imaging device 24, whether upward or downward along the track, images are captured over a full range of vantage points, thus capturing upwardly angled points of view from a lower segment of the track situated below the mannequin's midsection, downwardly angled points of view from an upper segment of the track situated above the mannequin's midsection, and a more straight-on point of view from a central region of the track at or near the mannequin's midsection.

Meanwhile, whether performed on a continuous basis at a slow rate throughout ongoing vertical passes of the digital imaging device 24 up and down the track, or performed on an indexed or incremental basis only at time intervals between sequential vertical passes of the digital imaging device, the computerized controller 18 drives rotation of the motorized spindle 84 of the rotational support structure 99 to rotate the mannequin about the rotational axis. Through the combination of automated vertical travel of the imaging device 24 on the curved track 102, automated rotation of the mannequin on a continuous or incremental basis, and automated image capture by the imaging device 24 at various elevational points in its vertical travel, a comprehensive three-dimensional image capture of the mannequin and its adorned garment(s) is achieved, and stable image capture is ensured by the mechanical support of the imaging device 24 at each and every vantage point from which the images were captured. Meanwhile, the optional but preferable use of a separately discrete, general purposes digital imaging device 24 (digital camera, smartphone, tablet computer, etc.) keeps the cost of the image capture guidance system low by omitting a dedicated imaging device. While the image capture guidance system is particularly useful in combination with a shape-adjustable mannequin, it will be appreciated that it could also be used for three-dimensional imaging of a conventional fixed-size mannequin.

From the forgoing, it will be appreciated that the unique body suit of the present invention has several useful applications, including, but not limited to:

1. Use for pre-production techniques in the garment industries, where the body shape data files can be used for pattern making or can be incorporated into existing pattern-making software systems.
2. Use for post-production techniques on existing garments, including alterations to existing garments; use for garment testing purposes—i.e. evaluating the maximum permitted expansion of a garment before failure; evaluating restrictive areas in a garment design—i.e. knees, elbows, crotch area; evaluating the elasticity/stretch of various kinds of fabric or sewing/integrating techniques; etc.
3. Use for made-to-measure garment production based on a 3D scan of the customer's body.
4. Use to capture the customer's desired garment fit based on photos or actual samples of the customer's existing clothing, or based on 'stylist' advise or recommendation. In such scenarios, the body suit is expanded to the customer's body shape and a garment adorned over the expanded body suit is compared against a "desired fit" based on (i) provided photographic evidence of a customer's preferred fit, (ii) a sample garment obtained from the customer to reflect their preferred fit, or (iii) a stylist's suggested/recommended fit.
5. Use for data collection and analysis, optionally using artificial intelligence, for identifying mass consumer sizing patterns based on accurate measurements of a population sample of remote users and cross-referenced by multiple categories; i.e.—waist size, height, neck length, neck circumference, wrist bone to middle to middle of back of hand calculation (for suit jacket hang length) etc.
6. Use for creating a World Wide Accurate Garment Sizing Standard (WWAGSS). By nature of the accuracy of every single body dimension calculation based on a body scan, a whole new "Body measurement" system can be an accepted and accredited as the "New Standard" to be used by consumers, designers, pattern makers, and garment manufacturers, eliminating multiple garment sizing standards currently employed.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A shape adjustable body comprising:
   a body suit resembling at least a partial human body form, and comprising a plurality of fluid-expandable layers, including:
   an outer skin layer comprising an outer plurality of fluid-expandable cells arranged for selective fluid-driven expansion thereof in varying degrees or quantities to create a variable exterior skin contour of said body suit; and
   one or more additional layers underlying the outer skin layer and arranged for selective fluid-driven expansion thereof varying degrees or quantities to create a variable internal tissue depth beneath said variable exterior skin contour of said body suit, whereby the variable internal tissue depth and variable exterior skin contour cooperatively determine an overall outer body contour of the body suit.

2. The shape adjustable body of claim 1 wherein the one or more additional layers each comprise a respective plurality of fluid-expandable cells of larger size than the outer plurality of fluid-expandable cells in the outer skin layer.

3. The shape adjustable body of claim 1 wherein the one or more additional layers comprises an innermost layer contributing a skeletal/muscular shape profile, and an intermediate layer disposed between the innermost layer and the outer skin layer and contributing a fat tissue contour atop said skeletal/muscular shape profile.

4. The shape adjustable body claim 1 wherein the outer skin layer comprises a fluid channel underlying at least some of the outer plurality of fluid-expandable cells, each of which is fluidly communicable with said fluid channel through a respective control valve operable to control opening and closing of the outer plurality of fluid-expandable cells to said fluid channel.

5. The shape adjustable body of claim 1 wherein at least some of the outer plurality of fluid-expandable cells each have at least one of the following:
   (a) a positional sensor that is mounted on, embedded in, or integrated within an outer envelope of the outermost skin layer and operable to monitor a position in space to which said positional sensor is displaced by fluid-driven expansion of said body suit;
   (b) a flow sensor operable to measure fluid flow into the fluid-expandable cell;
   (c) a pressure sensor mounted on, embedded in, or integrated within an outer envelope of the outermost skin layer operable to gauge a tightness of a garment adorned thereover.

6. The shape adjustable body of claim 1 in combination with a pressurized fluid source and a computerized controller storing body shape data representative of a targeted human body shape to be emulated by said body suit, wherein said pressurized fluid source is coupled to the body suit to convey pressurized fluid to the fluid-expandable cells, and the computerized controller is:
connected to a plurality of valves installed in fluid pathways between the pressurized fluid source and the outer plurality of fluid-expandable cells; and
operable, based on a mapping of body measurement data points from the body shape data to the plurality of fluid-expandable outer cells, to control said plurality of valves to selectively expand the fluid-expandable cells to emulate the targeted human body shape.

7. The shape adjustable body of claim 1 wherein an exterior of the outer skin layer is colored, or arranged for selective coloring, in green or blue for enabling application of chroma key compositing techniques to video or still images taken of said body suit.

8. The shape adjustable body of claim 7 wherein the body suit comprises internally located illumination sources operable to impart blue or green color to the exterior of the outer skin layer.

9. The shape adjustable body of claim 1 wherein the body suit comprises internally located illumination sources operable to impart colored illumination to an exterior of the outer skin layer to simulate a skin color of a human subject.

10. The shape adjustable body of claim 1 wherein said body suit has a hollow central space that spans head to toe of said body suit and is surrounded by the outermost skin layer and the one or more additional layers, whereby said body suit is compatible for use with a separate core body over which the body suit is wearable as a separate cover.

11. The shape adjustable body of claim 1 comprising a set of tether anchors mounted or mountable at extremities of the body suit, and for each tether anchor, at least one tether having a first end connected or connectable to said tether anchor and a second end connectable to a sleeve, leg cuff or hem of a garment worn over said body suit to prevent said garment from riding up from the extremities of said body suit during expansion thereof.

12. The shape adjustable body of claim 1 in combination with a rotational support structure by which said body suit can be revolved about an axis, and comprising a fluid conveyance conduit entering said body suit on or along said axis.

13. The shape adjustable body of claim 1 wherein the plurality of fluid-expandable cells of the outer skin layer comprise at least a first array of fluid-expandable cells, a first inner envelope shared by said first array of fluid-expandable cells, a first outer envelope shared by said first array of fluid-expandable cells, and a first set of dividing walls spanning between the first inner and outer envelopes to subdivide a first space therebetween into individual cells of the first array, whereby fluid-driven expansion of the individual cells of the first array in different degrees or quantities will bulge some areas of the first outer envelope further outwardly away from the first inner envelope than other areas, thereby establishing non-uniformity in the variable exterior skin profile.

14. The shape adjustable body of claim 13 wherein the outer skin layer comprises a second array of fluid-expandable cells underlying the first array of fluid-expandable cells, a second set of divider walls spanning between the inner envelope of the first array of fluid-expandable cells and an inner envelope of the second array of fluid-expandable cells to subdivide a second space therebetween into individual cells of the second array which are each neighboured by an adjacently stacked cell of the first array, and a respective inter-cell control valve installed between each individual cell of the second array and the adjacently stacked cell of the first array at the inner envelope of the first array to control airflow into the adjacently stacked cells of the first array from the individual cells of the second array during expansion of the outer skin layer.

15. A shape adjustable body comprising a body suit resembling at least a partial human body form and comprising:
an expandable/collapsible layer that comprises:
at least a first array of fluid-expandable cells;
a first inner envelope shared by said first array of fluid-expandable cells, a first outer envelope shared by said first array of fluid-expandable cells;
a first set of dividing walls spanning between the first inner and outer envelopes to subdivide a first space therebetween into individual cells of the first array, whereby fluid-based expansion of the individual cells of the first array to different degrees will bulge respective areas of the first outer envelope further outwardly away from the first inner envelope to establish a non-uniform profile at the outer envelope of said array that contributes to or defines an outer body contour of the body suit;
a second array of fluid-expandable cells underlying the first array of fluid-expandable cells;
a second set of divider walls spanning between the inner envelope of the first array of fluid-expandable cells and an inner envelope of the second array of fluid-expandable cells to subdivide a second space therebetween into individual cells of the second array that are each neighboured by an adjacently stacked cell of the first array; and
a respective inter-cell control valve installed between each individual cell of the second array and the adjacently stacked cell of the first array at the inner envelope of the first array to control airflow into the adjacently stacked cells of the first array from the individual cells of the second array during expansion of the expandable/collapsible layer.

16. A shape adjustable body comprising a body suit resembling at least a partial human body form and comprising a plurality of fluid-expandable cells arranged for selective fluid-driven expansion thereof in varying degrees or quantities to create a variable outer body contour of said body suit, and internally located illumination sources operable to impart blue or green color to an exterior of the body suit for enabling application of chroma key compositing techniques to video or still images taken of said body suit.

17. A method of using the shape adjustable body of claim 16 comprising, with the body suit fluidly expanded to acquire a particular outer body contour resembling a targeted human body shape, capturing one or more digital images of a garment that is adorned on said body suit in a position covering some areas of said body suit while leaving one or more other green or blue colored areas of said exterior of said body suit exposed outside the garment, then using chroma key compositing to generate one or more composite images in which the one or more other green or blue colored areas of said body suit are omitted.

* * * * *